(12) United States Patent
Peterson et al.

(10) Patent No.: US 8,375,874 B2
(45) Date of Patent: *Feb. 19, 2013

(54) SEED METERING DEVICE AND SEED DISK FOR AGRICULTURAL SEEDER

(75) Inventors: Bruce D. Peterson, Lindsborg, KS (US); Brent W. Nelson, Falun, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 284 days.

This patent is subject to a terminal disclaimer.

(21) Appl. No.: 12/792,627

(22) Filed: Jun. 2, 2010

(65) Prior Publication Data

US 2010/0300341 A1  Dec. 2, 2010

Related U.S. Application Data

(60) Provisional application No. 61/183,355, filed on Jun. 2, 2009.

(51) Int. Cl.
*A01C 7/04* (2006.01)
(52) U.S. Cl. ....................................................... 111/185
(58) Field of Classification Search .................. 111/170, 111/177–185, 200
See application file for complete search history.

(56) References Cited

U.S. PATENT DOCUMENTS

| 6,109,193 | A  | 8/2000 | Crabb |
| 6,604,475 | B2 | 8/2003 | Peterson |
| 6,758,153 | B1 | 7/2004 | Hagen et al. |
| 7,341,010 | B1 | 3/2008 | Friestad et al. |
| 2003/0111001 | A1 | 6/2003 | Hagen |
| 2007/0039529 | A1 | 2/2007 | Sauder |

FOREIGN PATENT DOCUMENTS

EP  0140701 A2  5/1985

OTHER PUBLICATIONS

International Search Report and Written Opinion of the International Searching Authority for Applicant's International Patent Application No. PCT/US2010/037123, mailed on Dec. 28, 2010.
International Preliminary Report on Patentability dated Sep. 29, 2011, International Application No. PCT/US10/37123.
Response to Written Opinion of International Searching Authority dated Mar. 28, 2011, International Application No. PCT/US10/37123.

*Primary Examiner* — Christopher J. Novosad
(74) *Attorney, Agent, or Firm* — Jeffrey L. Thompson; Thompson & Thompson, P.A.

(57) ABSTRACT

A seed metering device for agricultural seeders has a meter housing, a seed disk covering an open side of the meter housing, and a brush assembly mounted within the meter housing and contacting the seed disk. The meter housing has a seed delivery opening for delivering a supply of seed into a seed pool area, an air inlet provided above the seed pool area for receiving a supply of positive pressure air into the meter housing, and a seed exit area where seed can be dropped into a seed tube. The seed disk has seed pockets spaced around its outer circumference that pass through the seed pool and pick up individual seeds as the seed disk rotates. The device includes several features that help singulate and drop seeds in a way that provides a desired number of seeds per acre and a uniform spacing between the seeds in the furrow.

17 Claims, 17 Drawing Sheets

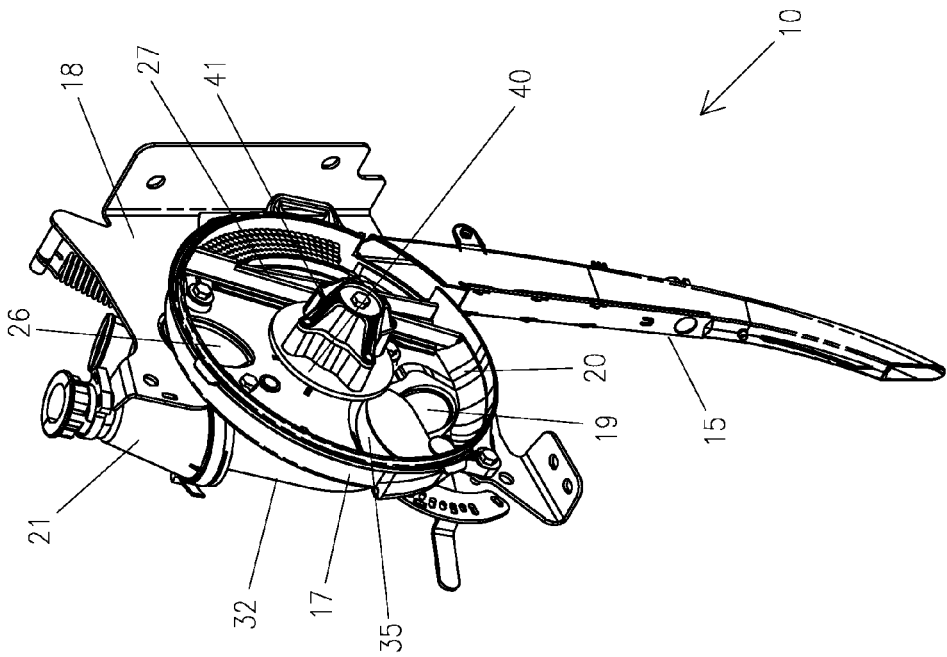
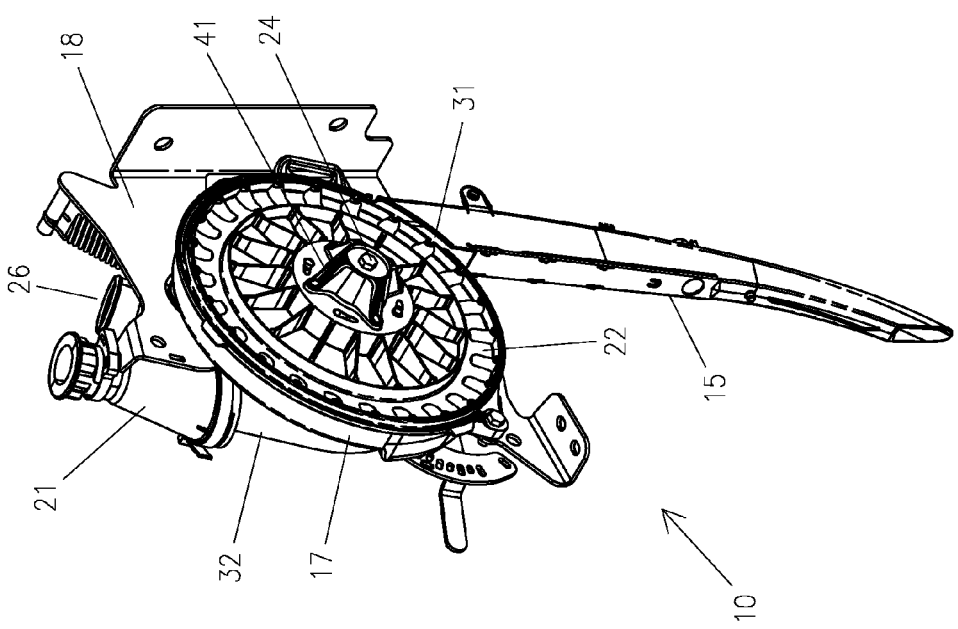

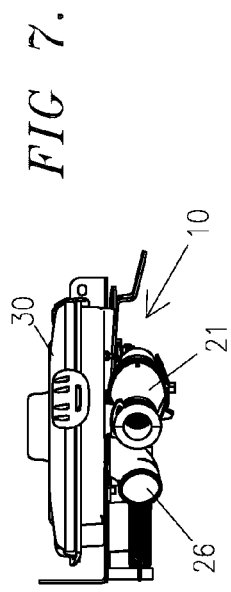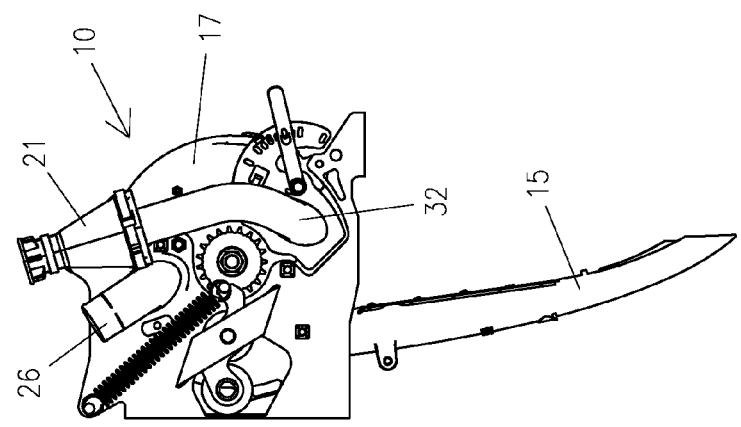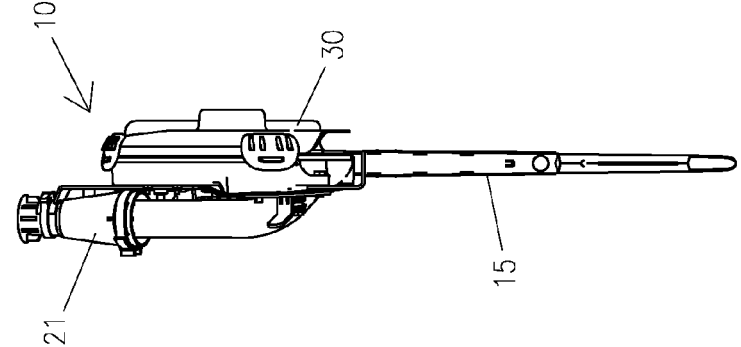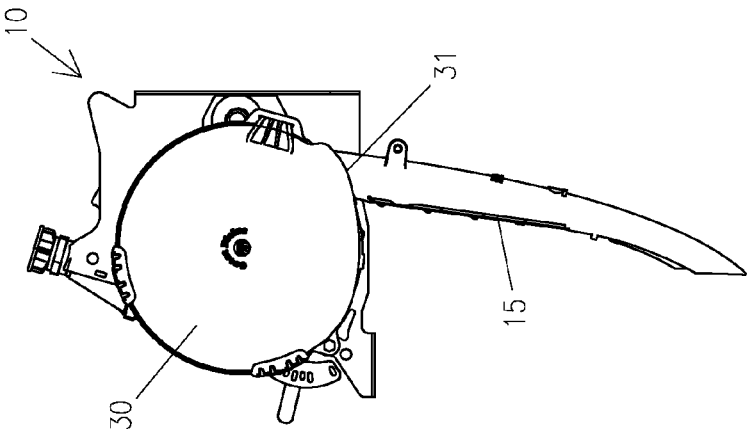

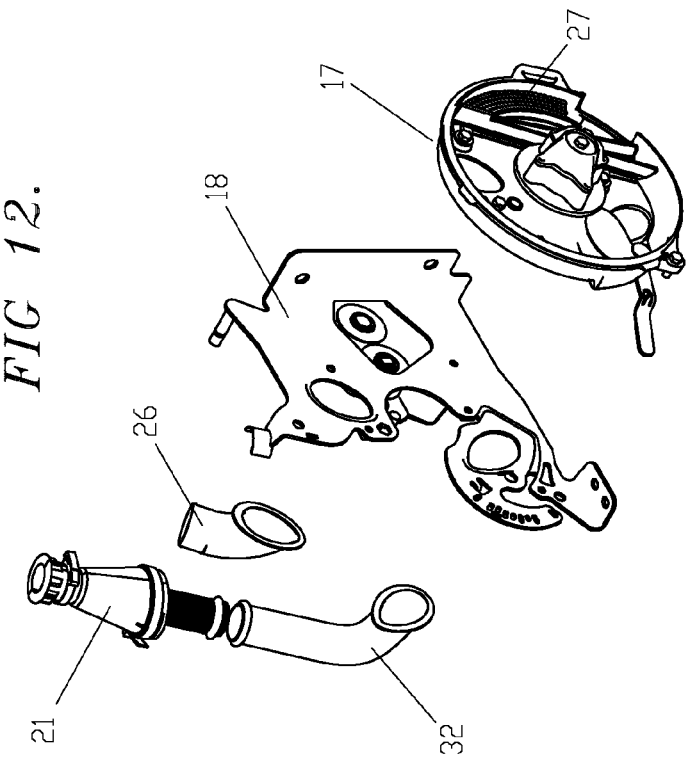
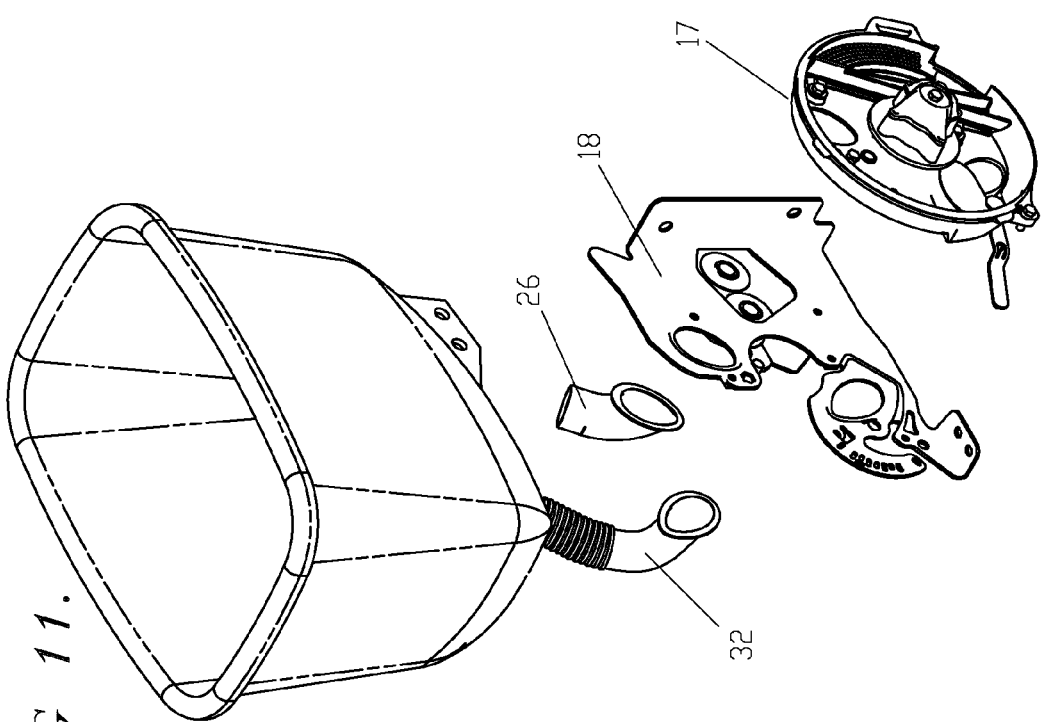

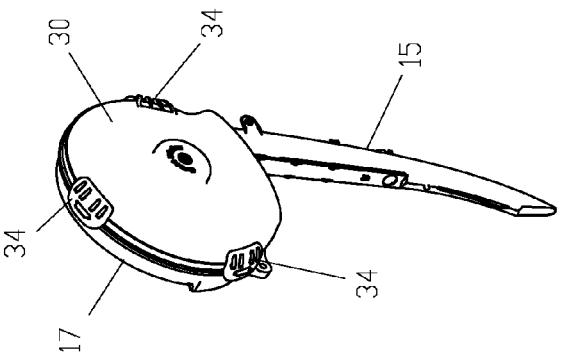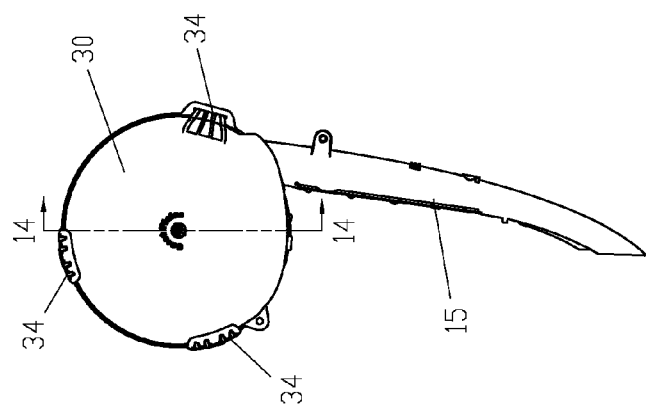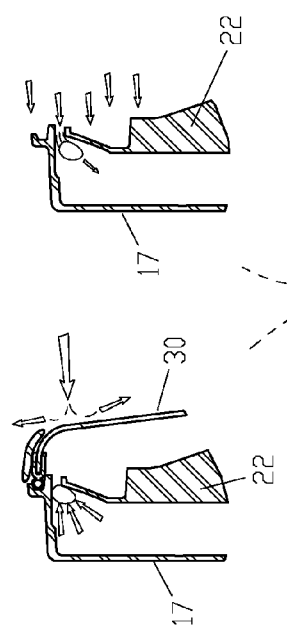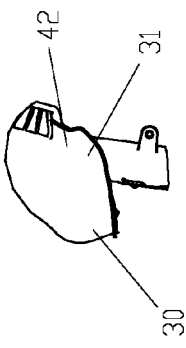

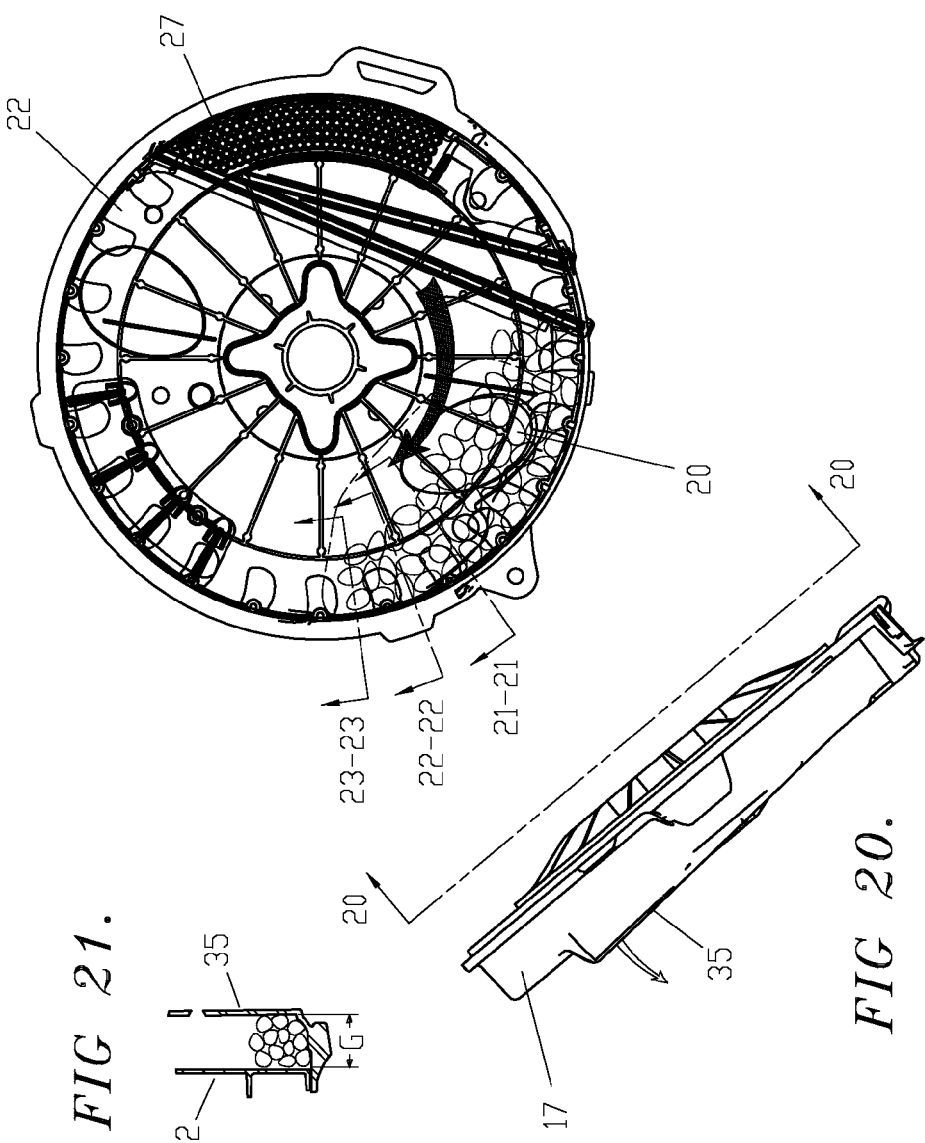
FIG. 19.
FIG. 20.
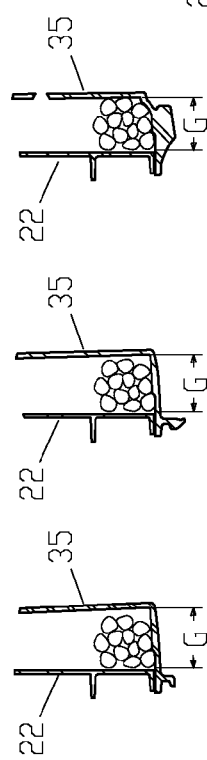 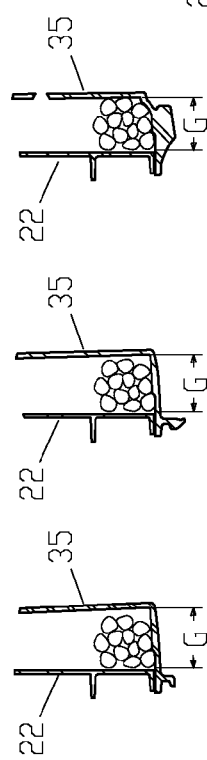 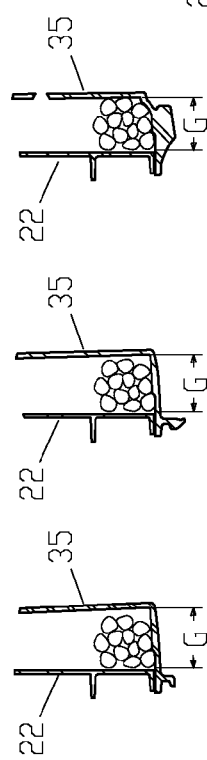 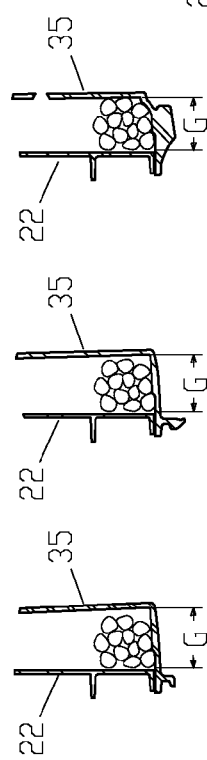
FIG. 23. FIG. 22. FIG. 21.

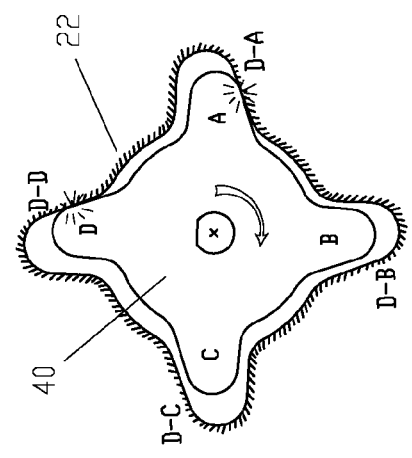
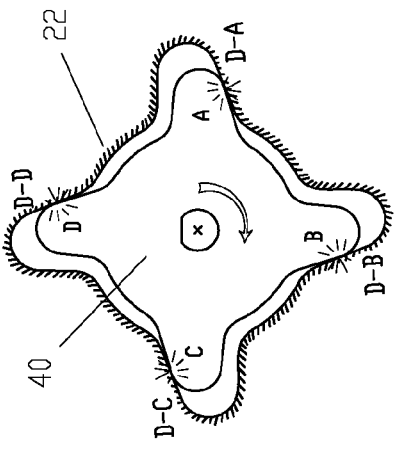
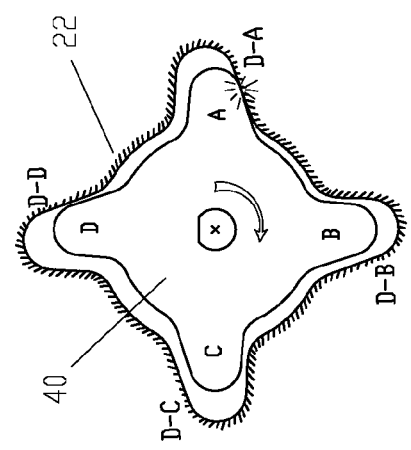
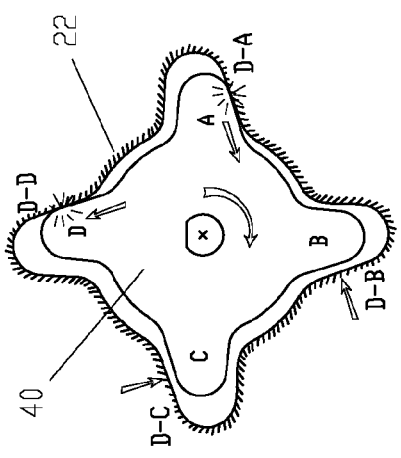
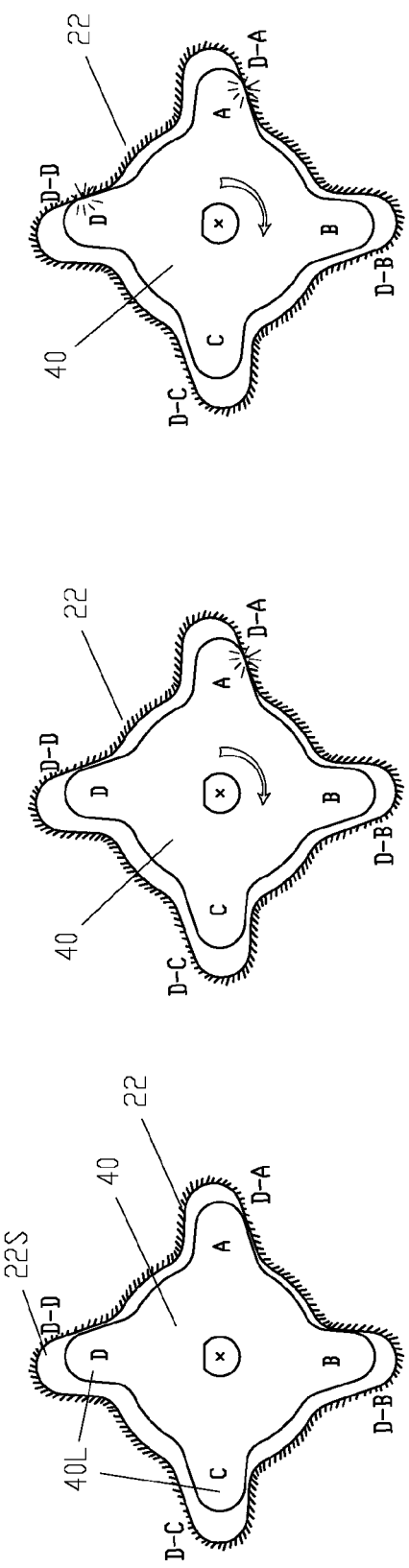

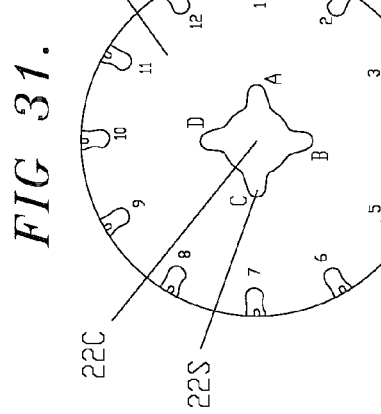
FIG. 31.
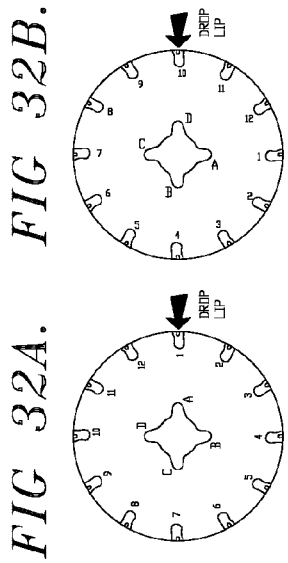
FIG. 32A. FIG. 32B.
FIG. 32C. FIG. 32D.
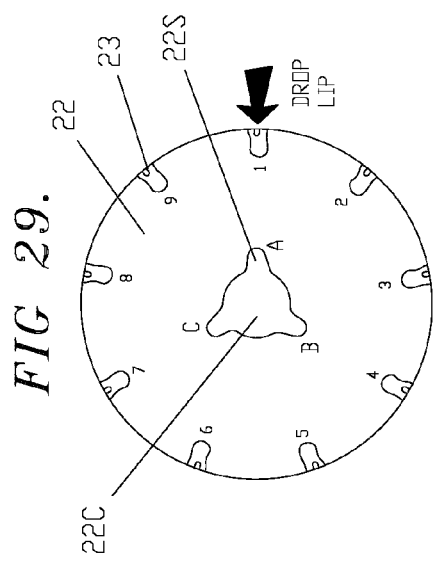
FIG. 29.
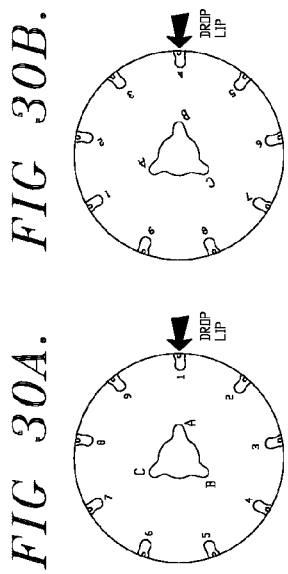
FIG. 30A. FIG. 30B.
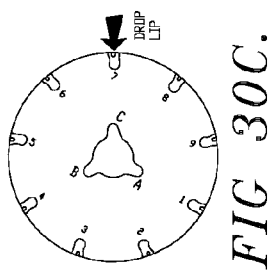
FIG. 30C.

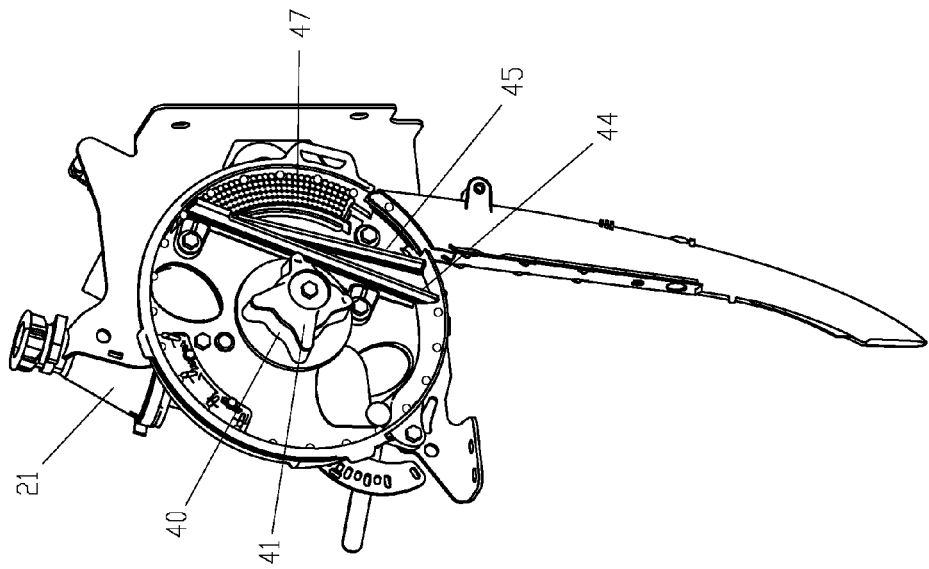
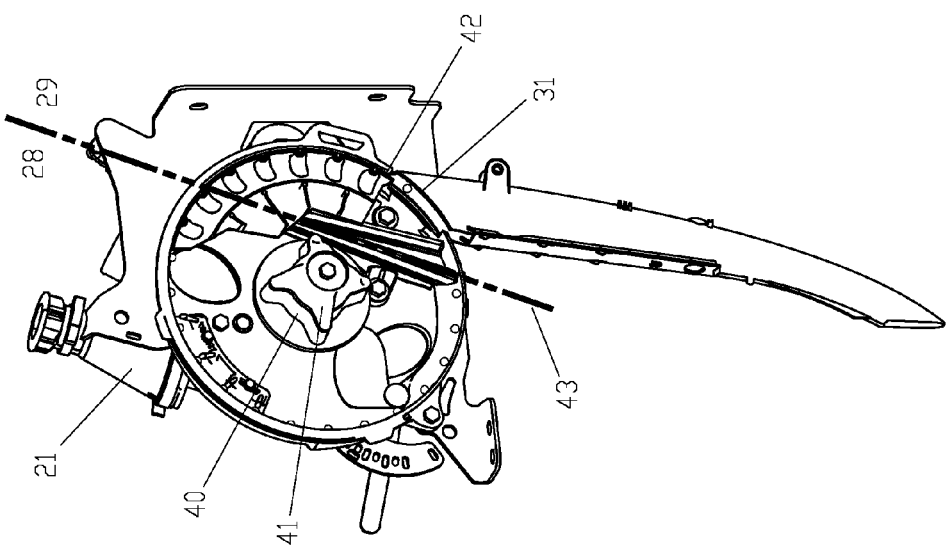

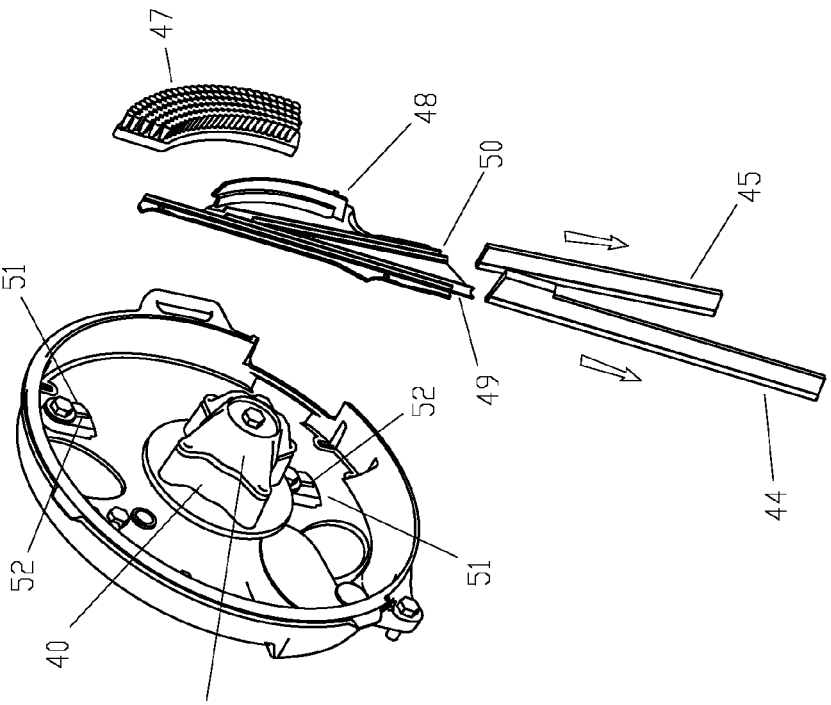
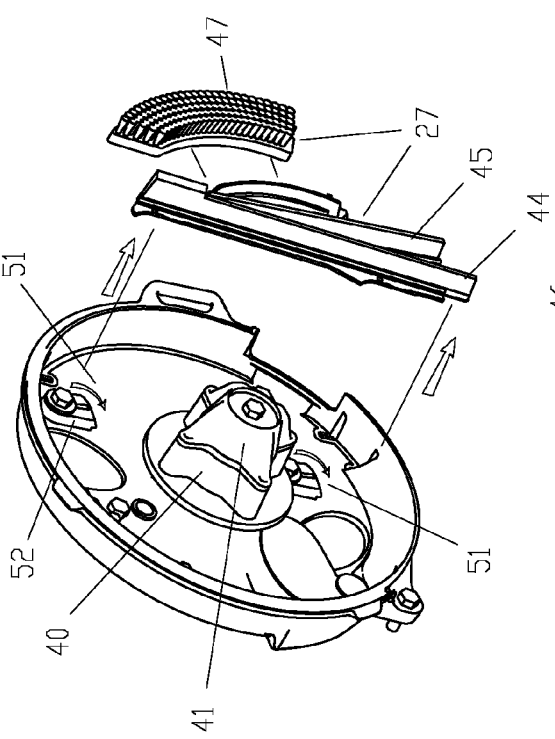
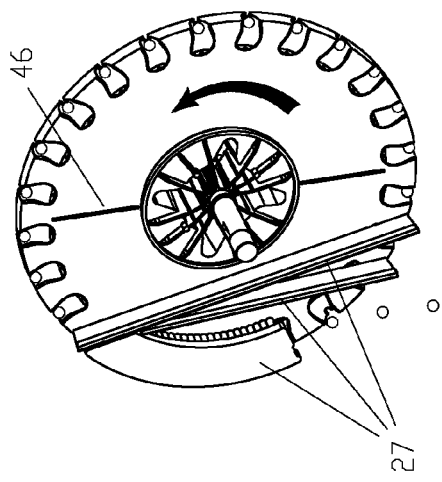

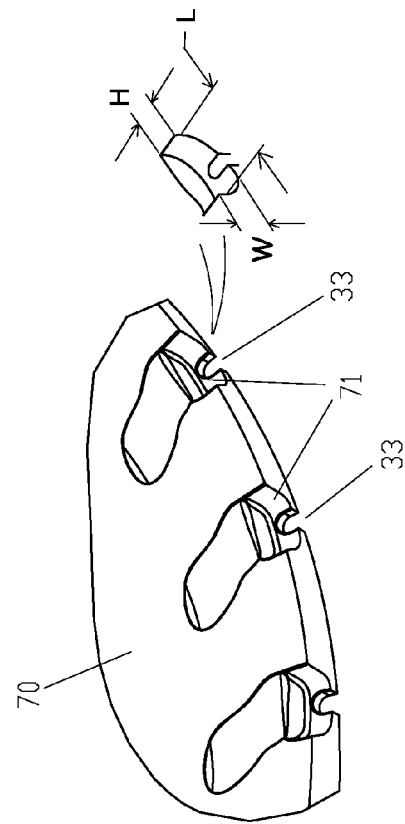
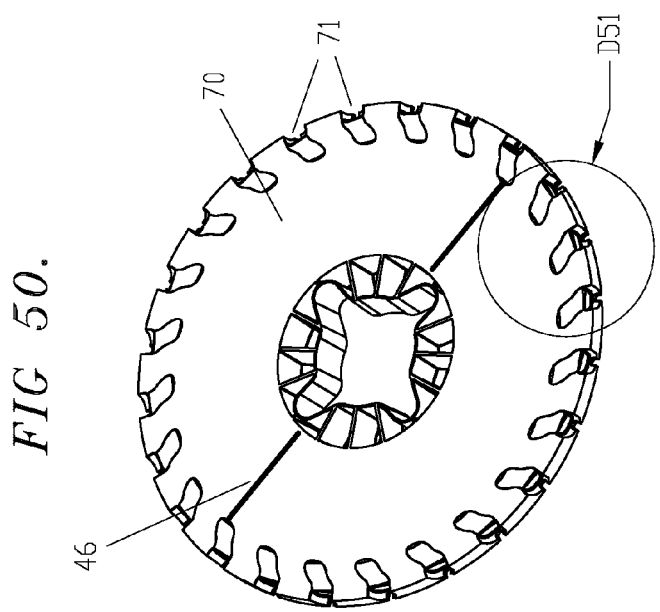
FIG. 50.
FIG. 51.

SEED METERING DEVICE AND SEED DISK FOR AGRICULTURAL SEEDER

RELATED APPLICATIONS

This application claims priority of U.S. Provisional Application No. 61/183,355 filed on Jun. 2, 2009. The content of this prior application is incorporated herein by reference.

BACKGROUND OF THE INVENTION

1. Field of the Invention

The present invention relates generally to agricultural seeders, and particularly to seed metering devices and seed disks for agricultural seeders.

2. Description of the Related Art

There are several styles of seed meters used on agriculture equipment manufactured today. Efforts have been made to obtain uniform seed spacing out of the meter, which is intended to give uniform plant-to-plant spacing in the field in order to maximize yields. To get perfect plant spacing, each seed has to be singulated and then released from the meter into a seed tube at a precise, repeatable time and trajectory.

There is a need in the industry for an improved seed metering device to improve seed spacing in an agricultural seeder.

SUMMARY OF THE INVENTION

An object of the present invention is to provide a seed metering device for agricultural seeders that provides improved seed spacing and solves other problems with prior art seeders and seed metering devices.

To accomplish these and other objects of the present invention, a seed metering device for agricultural seeders is provided having a meter housing, a seed disk covering an open side of the meter housing, and a brush assembly mounted within the meter housing and contacting the seed disk. The brush assembly includes strip brushes for creating an air seal between a pressurized side of the housing and a non-pressurized side of the housing. The meter housing has a seed delivery opening for delivering a supply of seed into a seed pool area on the pressurized side of the housing, an air inlet provided above the seed pool area for receiving a supply of positive pressure air into the meter housing, and a seed exit area on the non-pressurized side of the housing where seed can be dropped into a seed tube. The seed disk has seed pockets spaced around its outer circumference that pass through the seed pool and pick up individual seeds as the seed disk rotates, and then drop the seeds into the seed tube after the seeds pass a seed drop brush in the non-pressurized side of the housing.

The device includes several unique features that overcome problems found in the prior art and/or that help singulate and drop seeds in a way that provides a desired number of seeds per acre and a uniform spacing between the seeds in the furrow. These features include: (1) a modular design of the meter housing that allows the metering device to be adapted to various styles of row units and seed delivery options; (2) a rain/wind cover that protects the seed disk from moisture and side winds; (3) a seed pool area in the meter housing having a sloping back wall to create a gap that increases in a direction of disk rotation to prevent binding or pinching of seeds as the seed disk rotates; (4) a multi-lobed disk seat that self-centers the seed disk during operation without requiring a tight fit between the seed disk and the disk seat; (5) a multi-lobed coupling that allows the seed disk to be installed in multiple positions on the disk seat without affecting a predetermined timing between adjacent row units of a twin row seeder; (6) a brush assembly that includes a primary strip brush and a secondary strip brush for providing an air seal between the back wall of the housing and the face of the seed disk; (7) a brush wiper rib formed on the seed disk to dislodge residue from the brushes and help keep the brushes clean; (8) a brush holder that allows the primary and secondary strip brushes and the seed drop brush to be easily removed and reinstalled in the meter housing; (9) the use of electrically conductive brush fibers and/or additives in the molded plastic parts to dissipate static electricity within the metering device; (10) a seed disk having seed pockets with a leading lip that causes seed to fall straight down into the seed tube; (11) a meter housing having a seed ramp that nudges seed in the seed pool sideways toward the face of the seed disk; and (12) a seed disk having special pockets for accommodating flat corn seed.

Numerous other objects and features of the present invention will be apparent to those skilled in this art from the following description wherein there is shown and described embodiments of the present invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the present invention is made with reference to the accompanying drawings. In the drawings:

FIG. 4 is a right side rear perspective view of the seed metering device and seed tube assembly with the protective cover removed.

FIG. 5 is a right side rear perspective view of the seed metering device and seed tube assembly with the seed disk removed.

FIG. 6 is a left side elevation view of the seed metering device and seed tube assembly.

FIG. 7 is a plan view of the seed metering device.

FIG. 8 is a rear view of the seed metering device and seed tube assembly.

FIG. 9 is a right side elevation view of the seed metering device and seed tube assembly.

FIG. 11 is an exploded perspective view showing the modular construction of the seed metering housing and mounting bracket together with a row mounted hopper.

FIG. 12 is another exploded perspective view showing the modular construction of the seed metering housing and mounting bracket together with a seed inlet conduit for a pneumatic seed delivery system.

FIG. 13 is a right side elevation view of the seed metering device and seed tube assembly with the protective cover attached to the housing.

FIG. 14 is a cross sectional view, as viewed along line 14-14 in FIG. 13, illustrating the function of the protective cover to shield the seed disk from side winds.

FIG. 15 is a detail cross section view of the upper portion of the seed metering device showing the protective cover shielding the seed disk from side winds.

FIG. 16 is a detail cross section view of the upper portion of the seed metering device without the protective cover blocking the side winds.

FIG. 17 is a detail view of the lower portion of the seed metering device showing the protective cover shielding the top entrance of the seed tube.

FIG. 18 is a right side rear perspective view of the seed metering device with the protective cover installed.

FIG. 19 is a right side elevation view of the seed metering device.

FIG. 20 is a rear view of the housing of the seed metering device, as viewed along line 20-20 in FIG. 19, showing the sloping rear wall in the seed pool area.

FIGS. 21 to 23 are cross sectional views, as viewed along lines 21-21, 22-22, and 23-23 in FIG. 19, respectively, showing the sloping rear wall in the seed pool area.

FIGS. 24 to 28 are illustrations to show the self-centering action of the multi lobed clamp used to couple the seed disk to the disk seat of the metering device.

FIG. 29 shows a seed disk for coupling with a 3-lobe driver on the metering device.

FIGS. 30A to 30C illustrate the seed disk of FIG. 29 in its various installed positions while maintaining its timing relationship with the seed drop location.

FIG. 31 shows a seed disk for coupling with a 4-lobe driver on the metering device.

FIGS. 32A to 32D illustrate the seed disk of FIG. 31 in its various installed positions while maintaining its timing relationship with the seed drop location.

FIG. 33 is a right side perspective view of the seed metering device and seed tube assembly with the seed disk cut away to illustrate an air seal line created by a primary strip brush seal.

FIG. 34 is a right side perspective view of the seed metering device and seed tube assembly showing the primary and secondary strip brush seals.

FIG. 35 is an exploded perspective view of the seed metering device showing the strip brush assembly and the seed drop brush removed from the meter housing.

FIG. 36 is another exploded perspective view of the seed metering device showing the strip brush seals being removed from the brush holder.

FIG. 37 is a perspective view of the seed disk, strip brush assembly and seed drop brush, showing a wiping rib formed on the seed disk to wipe the fibers of the brushes.

FIG. 50 is a perspective view of a seed disk for handling flat corn seed.

FIG. 51 is a detail perspective view showing the details of the seed pockets of the seed disk of FIG. 50.

DETAILED DESCRIPTION OF THE INVENTION

An improved seed metering device 10 according to the present invention will be described with reference to FIGS. 1 to 51 of the accompanying drawings.

Figure 1:
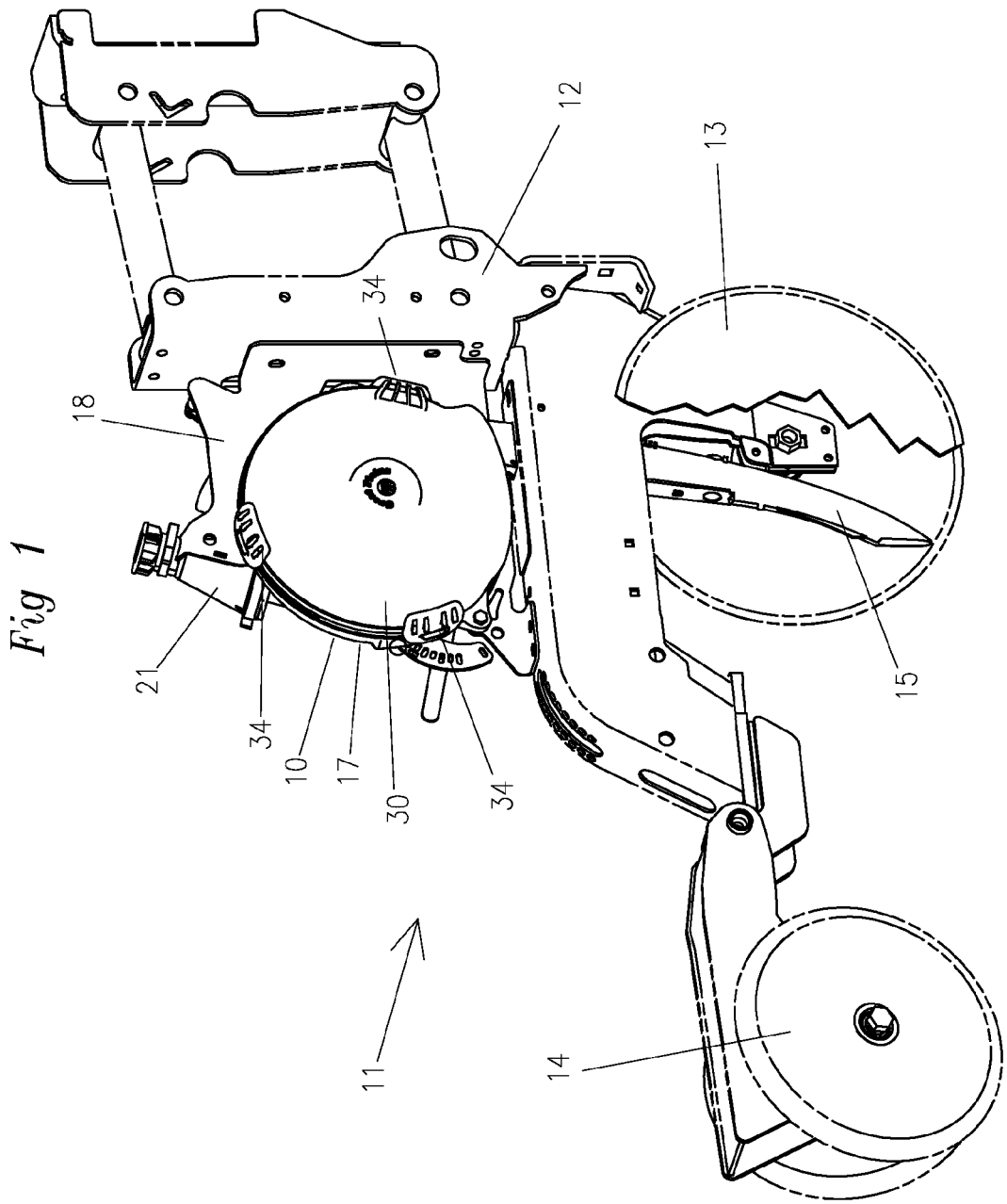
FIG. 1 is a perspective view of a row unit for an agricultural seeder equipped with a seed metering device according to the present invention.
Figure 2:
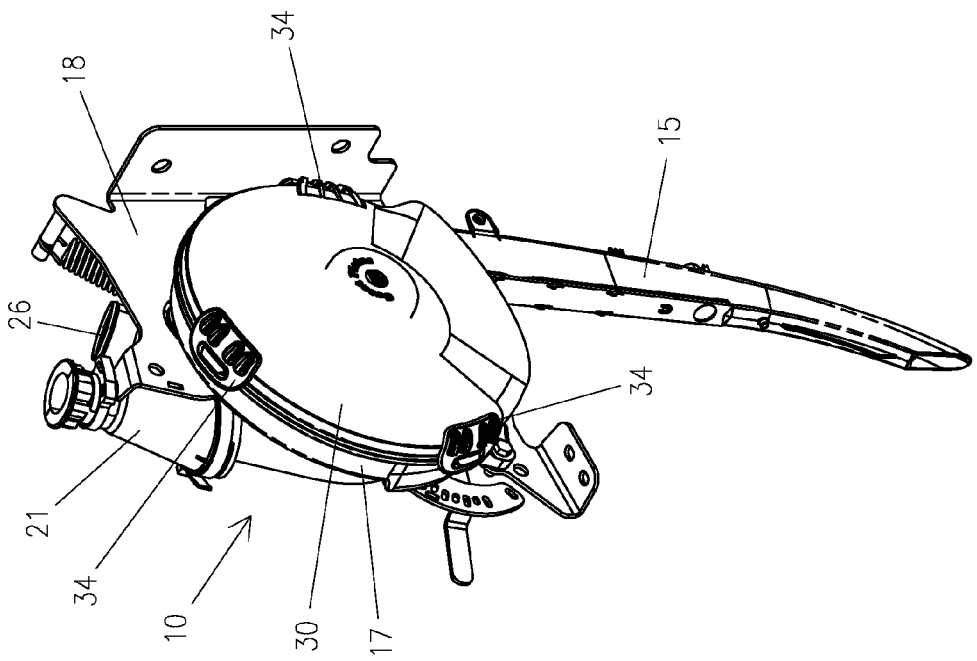
FIG. 2 is a left side rear perspective view of a seed metering device and seed tube assembly of the present invention.
Figure 3:
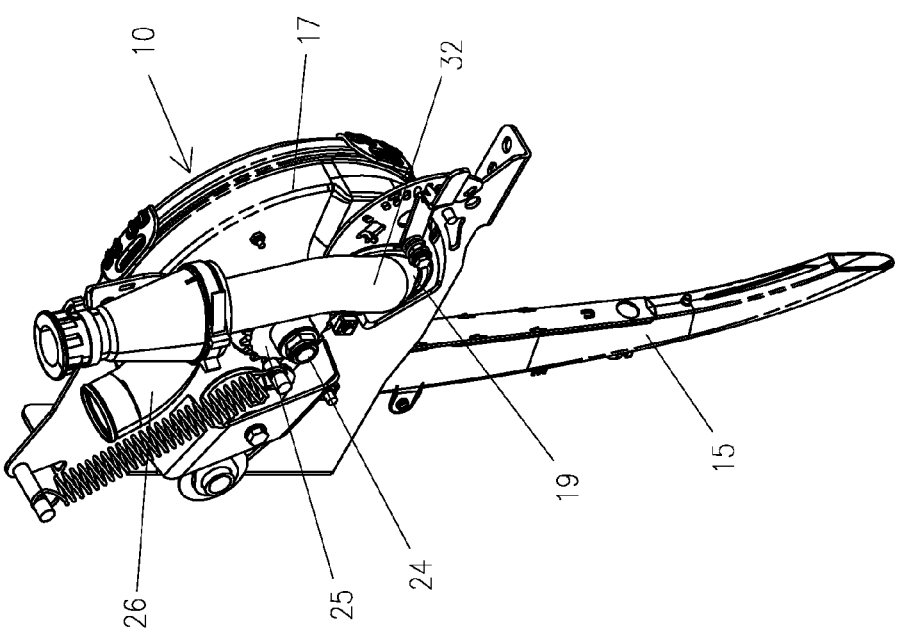
FIG. 3 is a right side rear perspective view of the seed metering device and seed tube assembly of the present invention.
Figure 10:
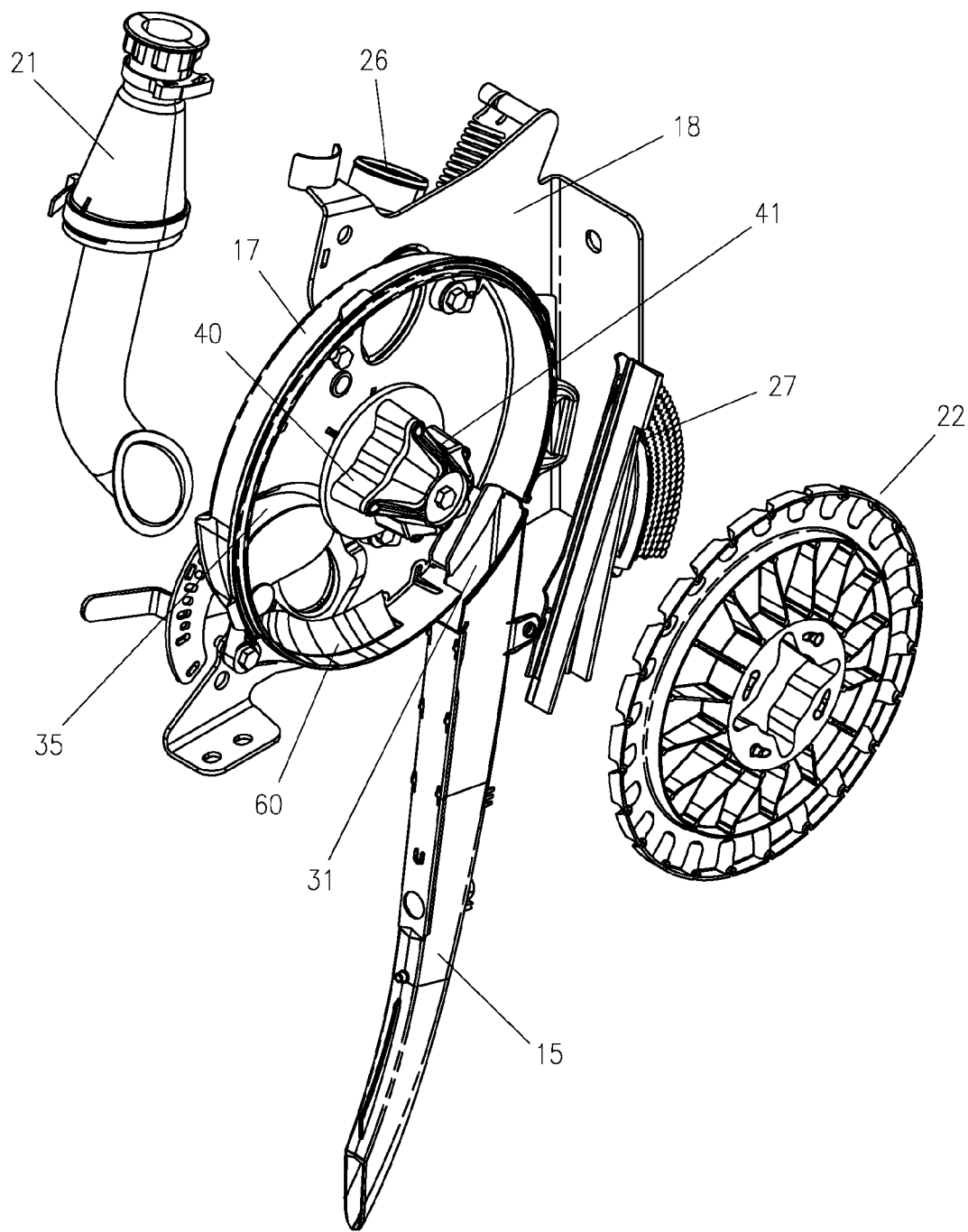
FIG. 10 is an exploded right side rear perspective view of the seed metering device and seed tube assembly, which shows the seed disk and removable brush assembly of the metering device.
Figure 39:
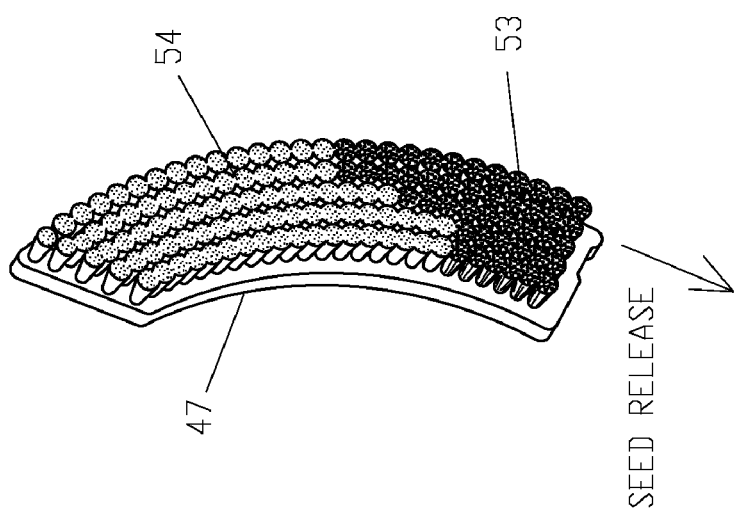
FIG. 39 is perspective view of a seed drop brush with a conductive fiber mix to prevent the build-up of static electricity on the seeds and internal surfaces of the seed metering device.

An agricultural seeder has a plurality of row units attached to a main frame. FIG. 1 illustrates one of the row units 11. The row units 11 are individually mounted so that each row unit 11 can move vertically relative to the main frame independently of the other row units. The row units 11 each include a subframe 12 that supports an opener assembly 13 for creating a seed furrow in the ground, depth gauge wheels (not shown), and closing wheels 14 that follow behind the opener assembly 13. A seed tube 15 is used with each row unit 11 to guide the seeds into the furrow created by the opener assembly 13.

A seed metering device 10 is mounted on the subframe 12 for singulating seeds and dropping the seeds one at a time into the seed tube 15. A goal of the seed metering device 10 is to singulate and drop seeds in a way that provides a desired number of seeds per acre and a uniform spacing between the seeds as they are placed in the furrow created by the opener assembly 13. The seed metering device 10 of the present invention incorporates several novel features to accomplish this goal and to provide other improvements over the prior art.

The seed metering device 10 includes a meter housing 17, and a mounting bracket 18 that mounts the meter housing 17 to the row unit subframe 12. The metering device 10 has a seed delivery opening 19 that allows a supply of seed to be delivered into a seed pool area 20 within the metering device 10. The seed can be delivered to the metering device 10 through a central fill bulk seed air delivery system, a gravity fed row unit hopper, or a gravity fed large linear box mounted above several row units. In the case of an air delivery system, an air release assembly 21 is provided upstream of the metering device 10 to ensure that the air used to convey the bulk seed does not interfere with the air used to singulate and pickup the seeds within the metering device 10.

The seed metering device 10 has a replaceable seed disk 22 that covers an open side of the meter housing 17. The seed disk 22 can be interchanged to adapt the seed metering device 10 to handle different crop seeds and seed sizes. The seed disk 22 has a series of pockets 23 that are spaced around the circumference of the disk 22 to pick up and singulate individual seeds from the seed pool 20. The pockets 23 of different seed disks 22 can be of different shapes and sizes to accommodate different seeds and seed sizes.

The seed disk 22 is mounted on a center shaft 24 that is coupled to a drive chain (not shown) and sprocket 25 (FIGS. 2 and 6) to provide a rotational driving force. The center shaft 24 causes the seed disk 22 to rotate relative to the housing 17 of the seed metering device 10. As the seed disk 22 rotates, the pockets 23 pass through the seed pool 20 and pick up seeds, which are then dropped individually from the seed metering device 10, as explained in more detail below.

An air inlet 26 is provided near the top of the meter housing 17 to receive a constant supply of positive pressure air into the meter housing 17. The positive pressure air functions to hold the individual seeds in the pockets 23 of the seed disk 22 until the pockets 23 have rotated around to a specific release point. A brush assembly 27 is provided within the meter housing 17 to separate the housing 17 into a pressurized zone 28 (FIG. 33) where the seed is loaded and held on the seed disk 22, and a non-pressurized (ambient air pressure) zone 29 where the seed can be dropped from the seed disk 22. A seed exit area 31 is provided where seed dropped from the seed disk 22 can exit the metering device 10 and fall into the seed tube 15.

A removable cover 30 is placed over the seed disk 22 and attached to the meter housing 17 to keep rain and dew away from the seed within the meter housing 17 and to keep side winds off the disk 22 and the seed exit area 31 of the metering device 10.

The unique aspects of the seed metering device 10 of the present invention will now be explained in more detail.
Modular Design The meter housing 17 has a modular construction, as shown in FIGS. 11 and 12. The meter housing 17 does not have any mounting surfaces that attach it directly to a row unit 11. Instead, the meter housing 17 is attached to a mounting bracket 18 that adapts it to a specific row unit 11. This modular design allows the metering device 10 to be adapted to various styles of row units 11 by fabricating a new mounting bracket 18 without the need to tool up a new meter housing 17.

The modular design allows seed to be fed to the metering device 10 by several different means by simply changing the seed inlet conduit 32 mounted on the side of the meter housing 17. Thus, seed can be delivered to the meter by: (1) gravity feeding the seed from a row mounted hopper (FIG. 11); (2) pneumatically delivering the seed from a central fill bulk hopper (FIG. 12); or (3) gravity feeding the seed from a large linear box mounted above several row units.

The modular design can also save the operator repair cost. For example, if a portion of the metering device 10 becomes worn over time or is damaged, only that portion of the metering device 10 need be replaced.
Rain/Wind Cover The positive pressure air metering device 10 of the present invention uses very low pressure air to hold seeds in the pockets 23 of the seed disk 22. When a seed is seated in the pocket 23 it covers the pocket's bleed hole 33 and forms a plug preventing most of the air from escaping. The seed creates and is exposed to a pressure differential which holds the seed in the pocket 23. The inside-the-meter side of the seed has low pressure air pushing on it, while the outside part of the seed has ambient air pushing on it. The difference in these forces is what holds the seed in the pocket 23. On prior art meters, the outside surface of the meter is exposed to the elements, including rain and side winds. If a strong side wind impinges on the bleed hole, the pressure differential is reduced because the outside air pressure rises. A reduced pressure differential results in a smaller force holding the seed in the pocket. If the opener happens to strike a foreign object in the field while this pressure differential is reduced, there is a chance that one or several of the seeds will fall from the disk resulting in a skip (or skips) in the field.

The present invention eliminates the risk of side winds indirectly causing seeds to drop off the disk 22 by covering the outside of the seed disk 22 with a removable vented cover 30, as illustrated in FIGS. 13 to 18. The cover 30 has a plurality of resilient latches 34 spaced about its circumference that are used to removably attach the cover 30 to corresponding structures on the meter housing 17. The cover 30 effectively blocks all side wind, but allows normal operating air to escape through a large opening in the bottom.

The removable cover 30 provides three main functions. First, the cover 30 sheds moisture to ensure that the inside of the metering device 10 is kept dry. It is common to park a seeder in the field during planting season, either overnight or for some time period if rainy weather halts planting. It is common, therefore, for dew or rain showers to periodically soak the seeder. Since the intent is to start using the seeder the next morning or as soon as conditions permit, seed is often left in the metering devices. The cover 30 is used to shed this moisture, thereby keeping the inside of the metering device 10, especially the seed pool area 20, dry. Seed exposed to moisture for even a few hours will swell and can cause meter plugging if not cleaned out before startup. This is different from prior art positive pressure meters, which are not covered and allow moisture to enter the meter.

Second, the cover 30 protects the seeds in the pockets 23 of the seed disk 22 from interference by side winds. This is illustrated in FIGS. 14 and 15, which show the cover 30 installed over the seed disk 22 and blocking the side winds. FIG. 16 shows the effect of side winds to change the effective pressure differential on the seed disk 22 without the cover 30. As illustrated, the cover 30 prevents the seeds from dropping off the seed disk 22 prematurely due to outside air impinging directly on the seed disk 22.

Third, the cover 30 provides wind protection for seeds falling into the seed tube 15, as illustrated in FIG. 17. As seeds fall from the pockets 23 of the seed disk 22, they are typically out in the open for a period of time before they enter the seed tube 15 where they are guided to the ground. If a seed is blown off its normal free fall course, its time enroute to the ground is delayed. If delayed, the seed will not land half way between the seed in front of it and the seed behind it. This uneven seed spacing in the row can result in yield loss. The cover 30 provides the seed protection from the wind during this critical time. The entrance 31 of the seed tube 15 is tucked well up inside the cover 30 so seed is protected from any ambient air movements as it leaves the disk 22 and enters the seed tube 15.
Seed Pool Area with Sloping Back Wall FIGS. 19 to 23 illustrate a feature of the seed meter housing 17 that improves the operation of the seed disk 22 within the seed pool area 20. The seed meter housing 17 has a sloping back wall 35 in the seed pool area 20. The back wall 35 is always pulling away from the seed disk 22 when viewed in terms of normal disk rotation. As illustrated in FIGS. 21 to 23, the gap G between the seed disk 22 and the back wall 35 increases in a direction of disk rotation within the seed pool area 20. This configuration ensures that no binding or pinching can occur if several seeds stack upon each other and form a column between the disk 22 and the back wall 35 of the housing 17. If a stacked column were allowed to slide into a fixed or narrowing opening, pinching, grinding or pushing on the seed disk 22 would occur as the column of seed toppled over itself. If severe enough, any disturbances like this can dislodge seeds from the pockets 23 of the seed disk 22 resulting in a skip or skips. The sloping back wall 35 of the meter housing 17 of the present invention eliminates any such seed skips.

Four Lobe Disk Seat Self Centering Action

It is important that the seed disk 22 be centered in the housing 17 and be held at the correct height relative to other items in the seed metering device 10 in order for the entire unit to perform optimally. Among other things it should be centered and held at the right "height" for the singulation brushes to have a predictable reach, and centered to prevent the outer circumference of the disk 22 from rubbing on the housing 17. Prior art has addressed this requirement in different ways. For example, the White/AGCO planter meter uses a straight machined piloting stem on the disk seat and a machined hole in the disk itself. The holes are sized so there is very little clearance, which does a good job in holding the disk centered. However, it is hard to remove the disk from the housing if the tolerances are not just right or if the clearance in the hole becomes silted in with dust from the field. Another method disclosed by John Deere in U.S. Pat. No. 7,341,010 to Friestad is to manufacture a conical seat and mating socket on the disk to hold the disk centered. This requires that the parts be manufactured with precision, and the disk must be forced axially inward until the conical surfaces engage, which introduces some uncertainty as to where the disk actually stops left to right.

The multi lobe disk seat 40 of the present invention has features that address these problems. The disk 22 is held in place by a spring-loaded, multi-lobed clamp 41. The clamp 41 urges the disk 22 inward and ensures that the working face of the disk 22 is always seated on the corresponding flat surface of the disk seat 40. Since the surface of the disk 22 and the surface of the seat 40 are both flat (not conical), the face of the disk 22 is always located at a correct and repeatable location.

The clamp 41 comprises a spring-loaded clamp structure having multiple tapered lobes that extend axially from the disk seat 40. The clamp structure 41 is rotatable relative to the disk seat 40 between a first unlocked position in which the tapered lobes of the clamp structure 41 are generally aligned with the tapered lobes 40L of the disk seat 40 for installing and removing the seed disk 22 from the disk seat 40, and a second locked position in which the tapered lobes of the clamp structure 41 are pressed against an outer surface of the seed disk 22 to urge the seed disk 22 against the disk seat 40. A plurality of shallow recesses are formed in the outer surface of the seed disk 22 to mate with corresponding projections on the lobes of the clamp structure 41. The recesses and projections cooperate to function as detents for keeping the clamp structure 41 in its second locked position during use.

The disk seat 40 is mounted on a center shaft 24 that is coupled to a drive chain (not shown) and sprocket 25 which provides the rotational driving force. The disk seat 40 has a raised, generally circular center protruding axially from its flat surface, and a plurality of tapered lobes 40L that extend outward from the raised center. The rotational force is transferred from the seat 40 to the disk 22 by the tapered lobes 40L. The disk 22 has a generally circular open center 22C that receives the raised center of the disk seat, and has corresponding sockets 22S for receiving each driving lobe 40L on the seat 40. For example, a 3-lobe disk would fit on a 3-lobe seat, and a 4-lobe disk would fit on a 4-lobe seat. In order to guarantee that the disk 22 can be easily removed and that it is always fully seated on the flat base 40 and not held up on a tapered centering cone, a generous clearance has been built in between the seat 40 and the disk 22. This clearance is crucial in letting the disk 22 be easily removed, but it introduces the apparent problem of the disk 22 not being held positively centered in the housing 17. To address this problem, the multiple drive lobes 40L are used to provide a self centering action.

The self centering action is illustrated in multiple stages in FIGS. 24 to 28. In stage 1 (FIG. 24), the disk 22 is placed in the metering device 10 and is locked onto the disk seat 40 by a spring loaded clamp 41. When installed the disk 22 will often be off center from the disk seat 40.

In stage 2 (FIG. 25), as soon as a driving force is applied to the metering device 10 both the disk seat 40 and disk 22 start to turn. When installed, the disk 22 is rubbing on the brush assembly 27 inside the metering device 10. The brush assembly 27 provides a gentle force to the face of the disk 22, a force that resists rotation. The friction between the flat face of the disk 22 and the flat face of the disk seat 40 is not enough to rotate the disk 22. These two surfaces slip relative to each other until one of the lobes 40L on the seat 40 encounters the side wall of the lobe socket 22S on the disk 22. In the illustration, lobe "A" has made contact with side wall "D-A".

In stage 3 (FIG. 26), after lobe "A" and "D-A" have made contact, the disk 22 continues to slip on the face of the disk seat 40. The relative motion generally pivots the disk 22 about the contact point "A" & "D-A". This slipping continues until the next lobe "D" makes contact with disk side wall "D-D". Note that the disk 22 is still not centered on the disk seat, and there are gaps at locations "B" & "D-B" and "C" & "D-C".

In stage 4 (FIG. 27), after two lobes have made contact, the slipping action between the disk 22 and the seat 40 continues but becomes more complex. To take up the gap between "B" & "D-B", note that "A" & "D-A" will remain in contact but they will slide sideways relative to each other. Likewise "D" & "D-D" will remain in contact but will slide relative to each other until the gaps at lobe "B" and lobe "C" have been closed.

In stage 5 (FIG. 28), all lobes are in contact and are driving. All relative motion between the disk 22 and the seat 40 has stopped. The disk 22 is fully seated on the disk seat 40. Since the driving surfaces are symmetrical about the axis of rotation and since there are more than two lobes, the disk 22 is now centered. It will remain centered because the resistive force from the brush assembly 27 causes the driving lobes 40L to remain in contact with the driving sockets 22S of the disk 22.

Note that this self centering action is not possible in a two lobe system, as illustrated in U.S. Pat. No. 7,341,010 of Friestad, because the forces exerted by the lobes act in only one direction.

Multi Lobe Disk Seat, Twin Row Meter Timing

In order to make the seed metering device 10 of the present invention compatible with the precise timing requirements of twin row seed planters, the relationship between the number of driving lobes 40L on the disk seat 40 and the number of seed pockets 23 is important. Once a pair of seed metering devices 10 arranged in a twin row configuration are timed, there is a need to keep them in time even if a disk 22 is removed for inspection. To accomplish this, the number of pockets 23 on the disk 22 must be a multiple of the number of lobes 40L on the disk seat 40. The end result is that no matter how a disk 22 is installed, one of several pockets 23 will end up at a predictable location. This location is critical in reference to the drop lip 42 of the meter housing 17, since this determines where the seeds will land in the row and makes twin row timing possible.

This can be illustrated by several examples in the following chart.

| NUMBER OF LOBES | NUMBER OF POCKETS |
| --- | --- |
| 3 | 3 |
| 3 | 6 |
| 3 | 9 |
| 3 | 12 |
| 3 | 15 |
| 3 | 18 |
| 4 | 4 |
| 4 | 8 |
| 4 | 12 |
| 4 | 16 |
| 4 | 20 |
| 4 | 24 |

FIG. 29 illustrates a 3-lobe disk, and FIG. 31 illustrates a 4-lobe disk. FIGS. 30A to 30C and FIGS. 32A to 32D illustrate examples of the 3-lobe disk and the 4-lobe disk being installed in any of the possible locations. Note that in each case a pocket 23 is in perfect timing with the timing arrow corresponding to the drop lip 42.

Brushes

During operation, the seed pool area 20 of the meter housing 17 is charged with low pressure air that will hold the seeds in their pockets 23 until the pockets 23 have rotated around to a specific release point. Before being released, the pressurized air must be fully removed so the seed is free to fall from the pocket 23 by the force of gravity. To accomplish this, the working face of the disk 22 is exposed to two pressure zones 28, 29 while it rotates. An air seal line 43 separates the two pressure zones 28, 29, as illustrated in FIG. 33. For example, a seed pocket 23 on the face of the disk 22 starts in the pressurized zone 28 where a seed is loaded and held. It next rotates past the air seal line 43 into a no pressure (ambient air pressure) zone 29 where the seed drop occurs. It is desirable to do a good job of trapping the air in the pressurized zone 28 of the metering device 10 for a variety of reasons. This is accomplished by the use of a resilient brush seal assembly 27 that forms a pliable seal on the face of the meter disk 22.

Prior art meters (e.g., AGCO/White) use close tolerances in an effort to seal off this air. The face of the disk is held close to, but not touching a metal barrier that is part of the meter housing. The small gap between the disk and the housing stops some but not all of the pressurized air from escaping. The escaping air can be considered wasted air that drives up the horsepower requirements of the seeder's air system and reduces efficiency. In some larger prior art seeders so much air is wasted that the hydraulic drive fan must be driven by a dedicated add-on hydraulic pump. It has been observed that the air escaping through this narrow gap passes along the face of the disk and is set free right in the area where the seed is falling out of the pockets. This escaping air causes the seeds to be pushed around after it leaves the disk and before it enters the seed tube. Seeds blown off course take a longer path to the ground and will arrive late and will be spaced improperly in the row.

To cut the air leakage across the face of the disk to a minimum, a resilient brush seal assembly 27 with fine resilient fibers has been used. The assembly includes a primary strip brush 44 and a secondary strip brush 45. The primary strip brush 44 extends from one side of the meter housing 17 to the other side along the air seal line 43 to provide the primary air seal. The secondary strip brush 45 extends between a point along a length of the primary strip brush 44 and a side of the meter housing 17 at an angle relative to the primary strip brush 44.

The secondary strip brush 45 provides a backup seal while a pocket 23 of the seed disk 22 is passing over the primary strip brush 44. The secondary strip brush 45 helps stop any leakage the primary seal of the strip brush 44 may have. As an empty pocket 23 of the seed disk 22 is returning into the pressurized area 28 of the metering device 10, it has to pass over the primary strip brush 44. The primary strip brush 44 does not reach to the bottom of the pocket 23, so for a brief period there is a leak path. The secondary strip brush 45 seals any such leak path.

As the seed leaves the pocket 23 of the seed disk 22, it could be blown off course by air leaking out of the pressurized side 28 of the meter. The resilient brush seal assembly 27 prevents any air leakage that would disturb the falling seed.

The strip brushes 44 and 45 provide a very efficient, self adjusting seal between the back wall of the housing 17 and the face of the disk 22. The flexible fibers of the brushes 44, 45 are long enough so they are flexed over when the disk 22 is installed. As the tips of the fibers wear away, the resilient fibers stand up and continue to contact the surface of the seed disk 22 to provide a long lasting seal. The strip brushes 44, 45 also provide an effective seal even if the seed disk location changes due to manufacturing tolerances.

Brush Wiper

As technology has evolved in agronomy there has been a trend to add pest control treatments directly to the seed. These treatments, whether they are applied wet or in a dry powder form, are intended to be dry by the time the seed is introduced to the seeder. However, experience has shown that these treatments are sometimes still sticky, especially in damp weather, and can sometimes be partially rubbed off when the seed is moved. This treatment residue can build up on the brushes that are providing a seal on the face of the disk. Over time, if not cleaned this treatment can keep building, stiffening the brush which degrades its ability to seal off the air.

The present invention has a wiping rib 46 on the face of the disk 22, which functions to keep the brush fibers clean and to agitate the seed in the seed pool 20. The wiping rib 46 comprises a raised structure formed on a surface of the seed disk facing the seed pool 20. The wiping rib 46 starts near the center of the disk 22 and extends radially outwardly on the face of the disk 22 until it ends near the pockets 23.

As the disk 22 rotates the wiping rib 46 passes through the tips of the brushes 44, 45 and 47 and dislodges seed treatments that have been caught there. By constantly wiping the fibers, the treatment rarely if ever builds up, and the need to clean brushes is greatly reduced. The undulations of the pockets 23 flex the outer areas of the brushes 44, 45 and 47, which keeps those areas clean.

Brush Holder

The two strip brushes 44, 45 (i.e., the primary strip brush 44 and the secondary strip brush 45) and the seed drop brush 47 are held in the meter housing 17 by a brush holder 48. The brush holder 48 has a first track 49 for holding the primary strip brush 44, and a second track 50 for holding the secondary strip brush 45. Outside the metering device 10, the strip brushes 44, 45 can be slid in and out of the tracks 49, 50 from the lower end of the brush holder 48. However, when installed in the meter housing 17, the strip brushes 44, 45 are trapped by the respective track 49, 50 and the side walls of the meter housing 17. In the metering device 10, the seed drop brush 47 is trapped by a lip on the brush holder 48 and the side and back wall of the meter housing 17. There are no separate fasteners required to retain the seed drop brush 47 in position.

The entire brush assembly 27, including the brush holder 48, the two strip brushes 44, 45, and the seed drop brush 47 are held in the metering device 10 by two lock tabs 51 that rotate up into a locked position. Each of the lock tabs 51 is held in place by a threaded bolt, a flat washer, and a spring element that allows the tab to be rotated between locked and unlocked positions. Screw driver slots 52 are also provided in the lock tabs 51 to make the latching and unlatching easier.

To remove the brushes 44, 45 and 47 for cleaning, the operator simply rotates the retaining lock tabs 51 down (with the aid of a screwdriver if needed). The holder 48 with the strip brushes 44, 45 and the seed drop brush 47 can then be pulled out of the housing 17. The two strip brushes 44, 45 can then be slid out of their tracks 49, 50 in the holder 48. No special tools are needed, and there is no loose hardware to drop or lose while the brushes are out. The brushes 44, 45, 47 can be removed in seconds for cleaning, inspection or replacing.

Static Control

During operation, the seeds and internal meter surfaces can experience a static electricity build up which can cause problems with a timely release of seed out of the pocket 23. The static electricity is a result of contact induced charge separation also known as triboelectric charging. As seeds bump and slide against each other and the side walls of the metering device 10, electrons will transfer to and from the surfaces resulting in unbalanced electrical charges. This can also happen where the sealing brushes 44, 45 rub on the face of the disk 22. The unbalanced charges will reside on the seeds, the face of the disk 22, and within the walls of the pockets 23 on the disk 22. A problem with seed release can occur if the pocket 23 takes on an opposite charge from that on a seed. Opposite charges attract and the seed will want to cling to the walls of the pocket 23. Low humidity conditions can make this static problem more severe.

Figure 38:
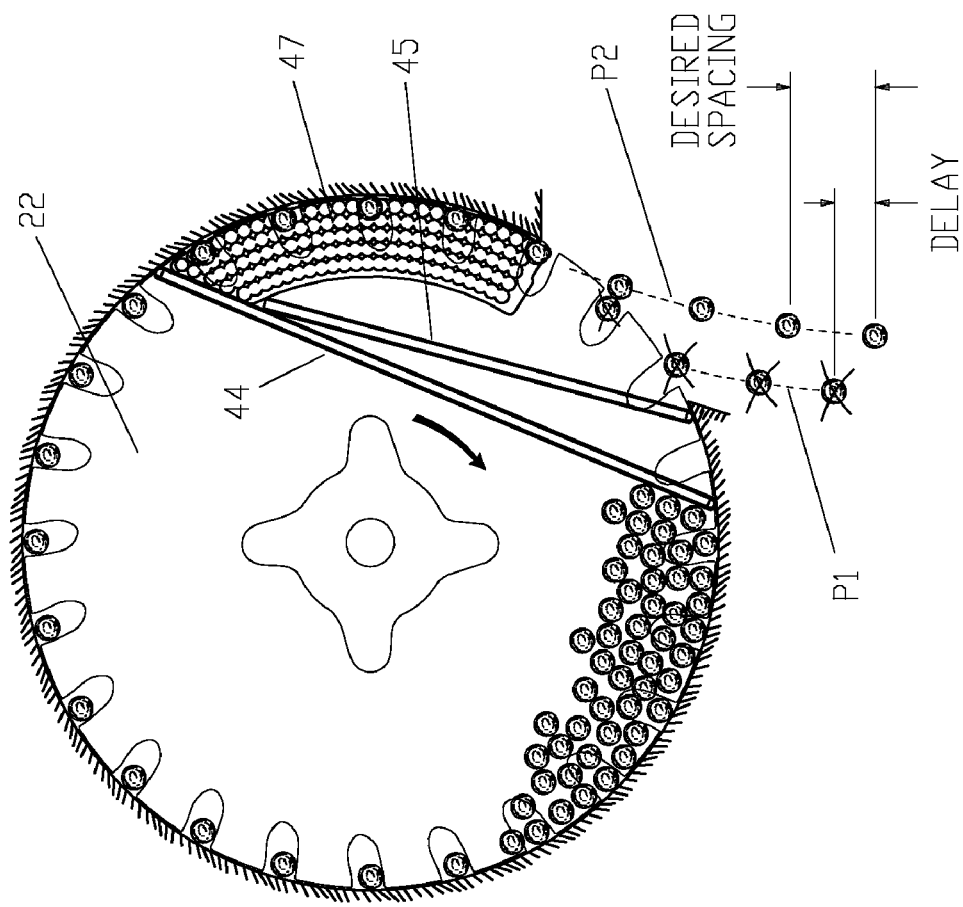
FIG. 38 is an illustration showing the effects of static electricity on the seed spacing of a seed metering device.

With small seeds, the clinging force in the pocket 23 can be great enough that the seed will not fall from the pocket 23 but will be carried around back into the seed pool 20 of the metering device 10. This results in a skip in the field. Under less severe conditions, the seed will cling to the pocket 23 but will eventually fall at a time later than what was intended. This cling time results in a delayed release for the seed, which is illustrated in FIG. 38. The cling time is not predictable so some seeds fall immediately in a path P2 after they clear the drop lip 42 (desired) and others will cling and fall much later in a path P1. This will result in uneven seed spacing in the row.

Several methods are used in the present invention to dissipate the static electricity within the metering device 10, including:

1. The seed disk 22 and disk seat 40 can be molded out of a plastic with an electrically conductive additive. Any electrical charge that builds up on the disk 22 will be dissipated through the disk 22, the seat 40, and out through the center shaft 24 and bearings.

2. The strip brushes 44, 45 can be made with electrically conductive fibers. The base of the strip brushes 44, 45 can be made of a folded aluminum or steel strip, which also conducts electricity. The metal strip can be grounded to the back wall of the housing 17 with a small grounding strip mounted in the brush holder.

3. The seed drop brush 47 illustrated in FIG. 39, also sometimes referred to as a block brush, can use a special conductive fiber, available commercially under the trademark THUNDERON. The special conductive fiber has a very fine layer of conductive material. When a static discharge (e.g., a spark) occurs at the tip of the fiber, ionized air is created in a process called the Corona effect. The ionized air neutralizes electrical charges on the seed and disk face. Since the special conductive fiber is relatively expensive it will preferably be mixed in with any commonly used brush fiber. For instance the mix could be 50% conductive fiber and 50% nylon fiber. Good results have also been achieved with a mix as low as 10 to 15% conductive fiber. The entire brush 47 could be filled with the conductive fiber mix, or to realize further savings only a patch of the brush could be filled with the mix. The brush 47 illustrated in FIG. 39 has a patch 53 down along the bottom edge filled with the conductive fiber mix, with the remaining area 54 of the brush containing a normal brush fiber. If a patch of conductive fiber is used it is critical that it be located generally along the outer edge down to and across an area of the bottom where the actual seed drop occurs and where a static buildup would cause problems.

Seed Disk Centerline Pocket Drop Lip

For some crops, corn in particular, it is critical to maintain an equal space between the plants to achieve maximum yields. Accurate spacing between plants minimizes competition from other plants and gives each plant access to its share of sunlight and ground resources, such as moisture and nutrients. To achieve the very high accuracy in seed spacing that is required in modern seeders, it is critical to pay attention to many design details. One example is the elimination of static electricity as explained earlier. Another critical area is the study of how the seed leaves the pocket 23 of the seed disk 22 and begins its free fall down the seed tube 15 towards the ground.

Getting accurate seed spacing in the field begins in the disk pockets 23. Each singulated seed is brought to the drop lip 42 by a series of pockets 23 that are perfectly spaced around the circumference of the disk 22. Thus, the pockets 23 are moving perfectly spaced seeds towards the drop lip 42 as the disk 22 rotates. Once released, gravity works on all the seeds the same, so in theory each seed should reach the ground with perfect spacing.

Figure 43:
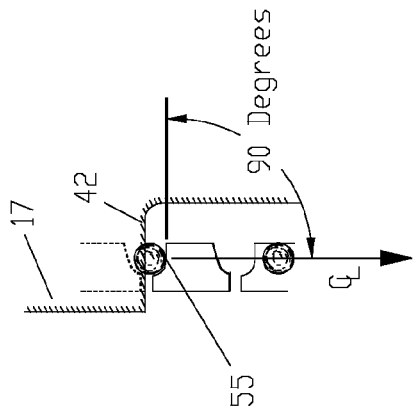
FIG. 43 is an edge view of the seed disk, as viewed along line 43-43 in FIG. 42, to show the leading edge of the seed pocket being perpendicular to the desired seed path.
Figure 40:
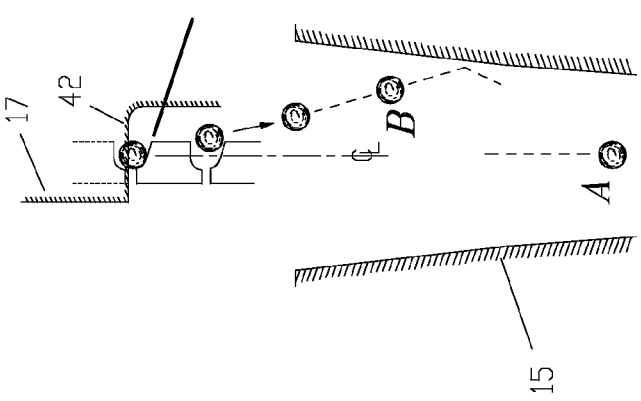
FIG. 40 illustrates an undesired seed drop path caused by prior art seed disks because the leading edge of the seed pocket is not perpendicular to the desired seed path.

One key to keeping the accurate spacing the disk 22 provides is to have each seed leave the pocket 23 exactly the same way and have each seed follow the same trajectory down into the seed tube 15. For example, start with a seed "A" that leaves the pocket 23 with no hesitation and it falls straight down the center of the seed tube 15, as illustrated in FIG. 43. The next pocket is carrying seed "B". If seed "B" were to exit the pocket traveling slightly sideways, as illustrated in FIG. 40, its trajectory would be different than that of seed "A". Seed "B" will fall but will continue on a course away from the opener centerline until it encounters the side wall of the seed tube 15. The seed tube wall will correct seed's course so the seed will eventually make it to the bottom and into the ground, but its irregular course has caused the seed to be late for two reasons. First, by moving side-to-side it has taken a longer path to the ground, which takes more time. Second, each time the seed bounces off a side wall of the seed tube, a small friction force acts on the seed opposite its direction of travel causing the seed to slow slightly. Even though these delays are slight, the seeder is traveling so rapidly across the field a slight delay will cause a seed to fall late and miss its intended drop target by several inches.

Figure 42:
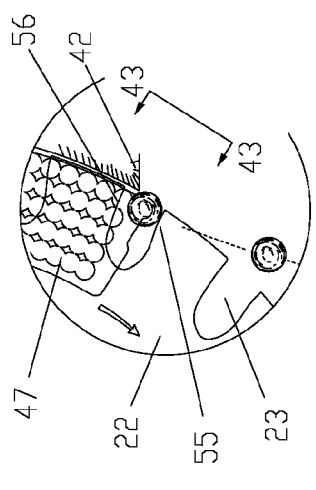
FIG. 42 is a detail view showing the seeds as they are dropped from the seed pockets of the seed disk.
Figure 41:
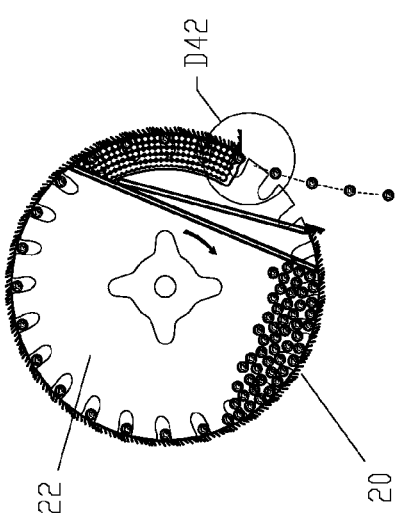
FIG. 41 shows the inside of the seed metering device with the seeds being dropped from the seed pockets of the seed disk.

Because of the seed delay, hitting the side walls is not desirable, and a repeatable centerline drop is critical. The seed metering device 10 of the present invention has replaceable seed disks 22 that can be changed to adapt the seed metering device 10 to handle different crop seeds and seed sizes. The different seed disks 22 each have seed pockets 23 that vary greatly in shape to accommodate different seeds and seed sizes. However, one thing each of the seed pockets 23 in the present invention have in common is a leading lip 55 that is perpendicular to the centerline of travel, or in other words, perpendicular to the centerline of the row unit and the seed tube 15. The perpendicular leading lip 55 is illustrated in FIGS. 41 to 43.

To understand how the leading lip 55 of the seed pocket is involved when the seed is falling from the pocket 23, a series of events that happen as the seed leaves the metering device 10 will be described. Before the seed falls from the pocket 23, the seed is in the pocket 23 of the seed disk 22 and is held in place by the seed drop brush 47. As the disk 22 rotates, the seed is generally against the trailing edge 56 of the pocket 23 because the trailing wall is pushing the seed along through the fibers of the seed drop brush 47.

When the seed clears the last fibers of the seed drop brush 47, it has not reached the housing's drop lip 42 so it is still retained by the inner circumference of the housing 17. Gravity acts on the seed, and since it's free, it begins to slide or roll forward away from the trailing edge 56 of the pocket 23 and towards the pocket's leading lip 55.

Before the seed fully clears the drop lip 42 of the housing 17, it encounters the leading lip 55 of the pocket 23. The leading lip 55 of the pocket 23 does two things: (1) it provides the final timing of the seed drop; and (2) it determines the seed's final trajectory.

a. Final timing: In step 1, the seeds are being held in the pocket 23 by the seed drop brush 47. The seeds being different sizes are not all held clear to the back of the pocket 23, and some that are very small are not reached by the brush 47 and can roll forward to the leading lip 55 of the pocket 23. Therefore, the seeds in the pockets 23 around the disk 22 are not all "timed" within the pockets. This random placement within the pockets 23 would result in small but measurable unevenness if allowed to fall as is. When the seeds clear the seed drop brush 47, they roll forward until they contact the leading lip 55 of the pocket 23. The end result is that they all end up in the same relative position on the disk 22 and are perfectly timed.

b. Final trajectory. The shape of the leading lip 55 of the pocket 23 is important. Prior art pockets had a leading edge that was sloped relative to the centerline of the seed tube, as illustrated in FIG. 40. This sloped leading edge allowed for easier seed fill in the seed pool, but had the undesired effect of imparting a sideways trajectory on the seed as it rolled off. The seeds leave the disk with different amounts of this sideways motion depending on if they roll or slide or bounce on the lip. This results in the seeds taking many different paths down the seed tube. Seeds that move sideways rapidly will hit very high on the side wall of the tube, bounce off and head towards the opposite wall. Others may have only a slight sideways motion and fall a great distance before hitting the side wall. Those that hit several times will be later than those that fall close to the centerline and do not need the side wall correction. This will result in uneven seed spacing in the field.

To eliminate the problem of introducing a side force on the seed as it leaves the leading lip of the pocket, the new pockets 23 are designed with a leading lip 55 that is generally parallel to the axis of rotation of the seed disk 22 and perpendicular to the centerline of the seed tube 15. By being perpendicular, seeds will always fall straight down the seed tube 15 whether they roll, slide or bump off this lip 55.

Once the seed in the pocket 23 clears the drop lip 42 of the meter housing 17, there is nothing to retain it in the pocket 23. The seed begins to roll or slide out of the pocket 23 while still in contact with the pocket's leading lip 55. By now the trajectory of the seed is mostly set, and as the disk 22 rotates down and forward, the leading lip 55 of the pocket 23 pulls forward and away from the seed letting it continue on its path down the centerline of the seed tube 15.

Seed Ramp

Figure 44:
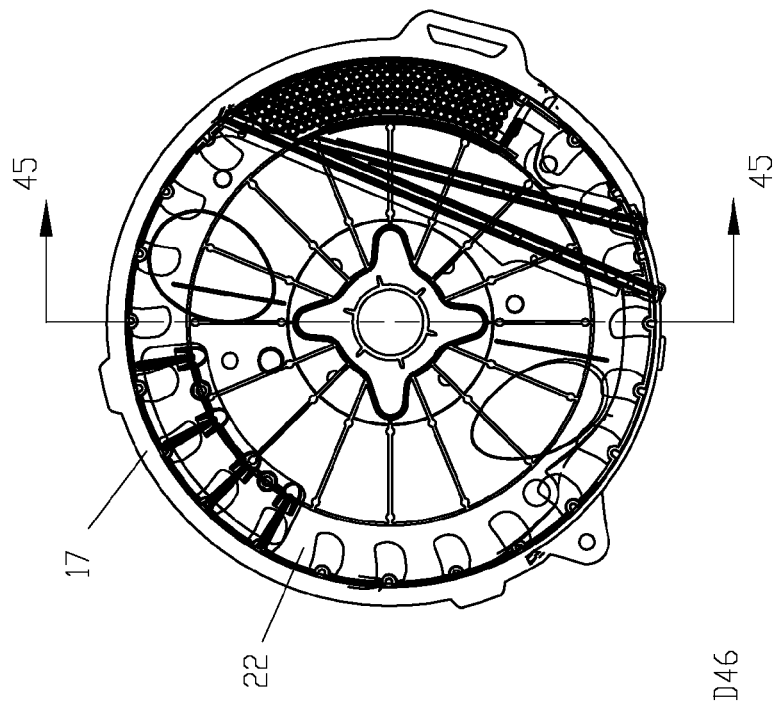
FIG. 44 is a right side elevation view of the seed metering device equipped with a seed disk for handling round corn seed.
Figure 45:
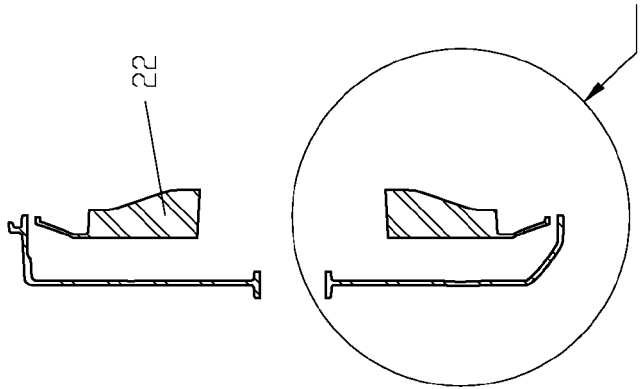
FIG. 45 is a cross sectional view of the seed metering device, as viewed along line 45-45 in FIG. 44.
Figure 46:
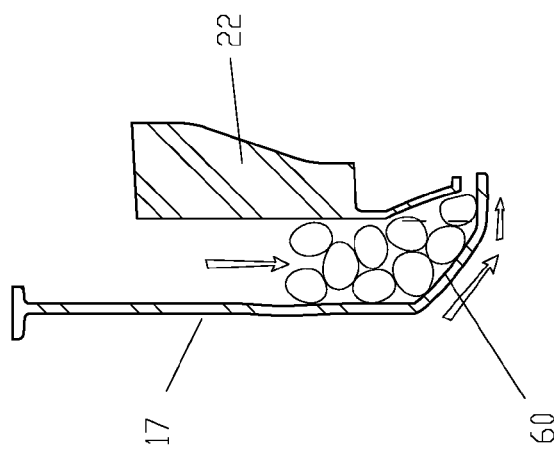
FIG. 46 is a detail cross section view of the lower part D46 of FIG. 45, which shows the seeds being guided into the seed pocket by a sloping surface at the bottom of the meter housing in the seed pool area.
Figure 47:
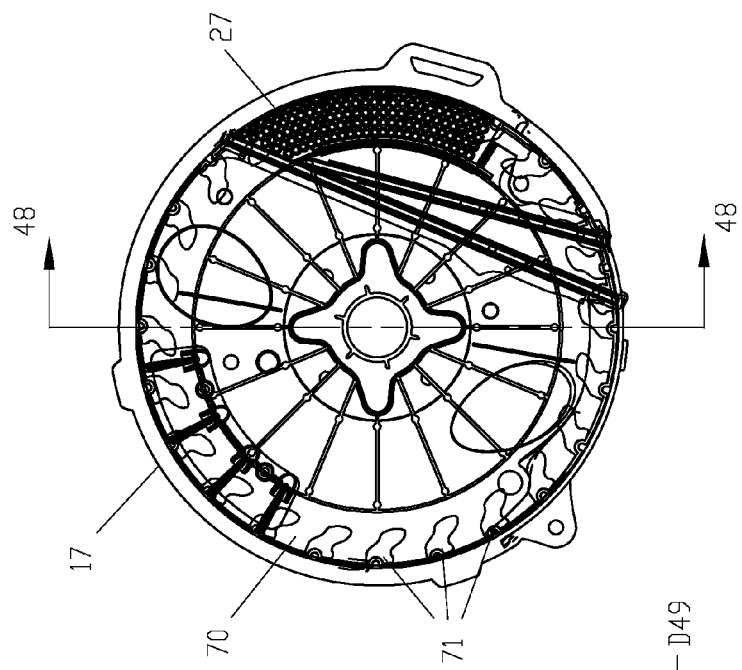
FIG. 47 is a right side elevation view of the seed metering device equipped with a seed disk for handling flat corn seed.
Figure 48:
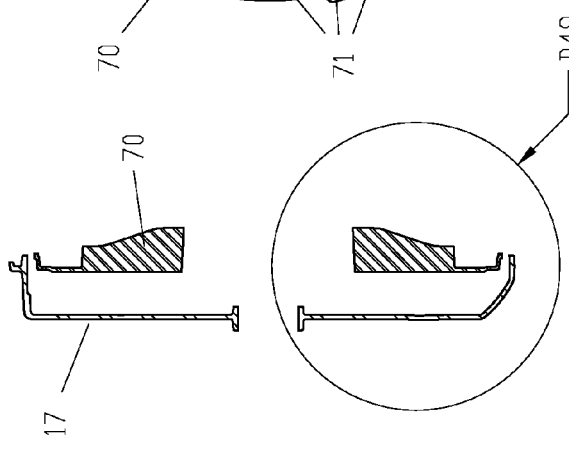
FIG. 48 is a cross sectional view of the seed metering device, as viewed along line 48-48 in FIG. 47.
Figure 49:
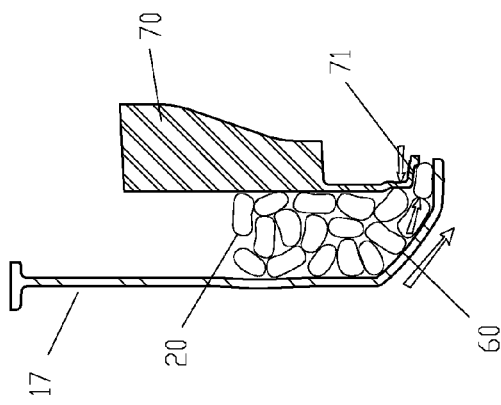
FIG. 49 is a detail cross section view of the lower part D49 of FIG. 48, which shows flat seeds being guided into the seed pocket by a sloping surface at the bottom of the meter housing in the seed pool area.

FIGS. 44 to 46 illustrate a seed ramp 60 in the meter housing 17 that improves the seed pick up by the seed disk 22 in the seed pool area 20. The seed ramp 60 is formed by the bottom of the housing 17 in the seed pool area 20 being generally sloped towards the seed disk 22. Gravity pulls the seeds to the bottom of the housing 17 where they encounter the sloping surface 60 and are nudged sideways towards the face of the disk 22. If a seed arrives at the face of the disk 22 and is in line with an open pocket 23, the seed will slide on in as a result of seeds behind it still on the ramp 60 that keep pushing.

Seed Disk with Pockets for Flat Corn Seed

FIGS. 47 to 51 illustrate a seed disk for accurately singulating and discharging flat corn seeds. Flat corn seeds are generally the kernels that come from the center portion of the corn ear between the base and the tip, and are not as round as the kernels from the base and tip portions of the corn ear. Flat corn seed can be a challenge for meters to singulate and discharge accurately. The applicant has developed a seed disk 70 with special pockets 71 for flat corn seed that work in conjunction with the seed ramp 60 at the bottom of the seed pool area 20.

When spread out on a table, flat corn seeds will generally fall over and end up with one of the two flat areas face down. A specially shaped pocket 71 in the seed disk 70 has been developed to take advantage of this tendency. The pocket 71 has a width in a direction parallel to an axis of the center shaft 24, and a height in a radial direction perpendicular to the width. The width of the pocket 71 is greater than the height of the pocket 71 so that the pocket will only accept seed that is oriented face down as described above. If a seed is standing up, its height prevents it from entering the pocket 71. Seeds at the bottom of the seed pool 20 end up flat face down on the seed ramp 60 and slide sideways into the pocket 71. The force urging the seed into the pocket 71 comes from gravity. The seed is pushed downward and is moved horizontally towards an open pocket 71 by the ramp 60. The seed is pushed on into the pocket 71 by trailing seeds that are still on the seed ramp 60.

While the invention has been specifically described in connection with specific embodiments thereof, it is to be understood that this is by way of illustration and not of limitation, and the scope of the application should be construed as broadly as the prior art will permit.

What is claimed is:

1. A seed metering device for an agricultural seeder, comprising:
   a meter housing having a seed pool area and a seed delivery opening that allows a supply of seed to be delivered into the seed pool area;
   a seed disk covering an open side of said meter housing, said seed disk having a series of pockets spaced around an outer circumference thereof, said seed disk being mounted on a center shaft that provides driving force to rotate the seed disk relative to the meter housing, said seed disk being arranged so that as the seed disk rotates the pockets of the seed disk pass through the seed pool and pick up seeds;
   an air inlet provided in said meter housing to receive a supply of positive pressure air into the meter housing for holding individual seeds in the pockets of the seed disk;
   a brush assembly provided within the meter housing to separate the housing into a pressurized zone where the seed is loaded and held in the pockets of the seed disk and a non-pressurized zone where the seed can be dropped from the seed disk;

a multi lobe disk seat mounted on the center shaft, said disk seat comprising a flat surface, a raised center protruding axially from the flat surface, and a plurality of tapered lobes that extend outwardly from the raised center; and said seed disk has a flat face that abuts the flat surface of the disk seat, an open center that receives the raised center of the disk seat, and a plurality of lobe sockets that receive the tapered lobes of the disk seat.

2. The seed metering device according to claim 1, wherein said plurality of tapered lobes comprise at least three tapered lobes, and said plurality of lobe sockets comprise at least three lobe sockets.

3. The seed metering device according to claim 1, wherein said plurality of tapered lobes comprise four tapered lobes, and said plurality of lobe sockets comprise four lobe sockets.

4. The seed metering device according to claim 1, further comprising a clamp for securing the seed disk onto the disk seat with the flat face of the seed disk abutting the flat surface of the disk seat.

5. The seed metering device according to claim 4, wherein said clamp comprises a spring loaded clamp structure having multiple tapered lobes that extend axially from said disk seat, said clamp structure being rotatable relative to said disk seat between a first position in which the tapered lobes of said clamp structure are generally aligned with the tapered lobes of said disk seat for installing and removing the seed disk from the disk seat, and a second position in which the tapered lobes of said clamp structure are not aligned with the tapered lobes of said disk seat and a surface of the clamp structure is pressed against an outer surface of the seed disk to urge the seed disk against the disk seat.

6. The seed metering device according to claim 1, wherein said lobe sockets are substantially larger than said tapered lobes so that said tapered lobes fit loosely within said lobe sockets with a clearance that allows the seed disk to be easily installed and removed from the disk seat, and wherein said tapered lobes and said lobe sockets are arranged to provide a self centering action during operation to center the seed disk on the disk seat relative to the meter housing.

7. The seed metering device according to claim 1, wherein said plurality of lobe sockets on said seed disk comprise at least three lobe sockets, said plurality of tapered lobes on said disk seat comprise at least three tapered lobes that fit loosely within said lobe sockets with a clearance that allows the seed disk to be easily installed and removed from the disk seat, and said tapered lobes and said lobe sockets are arranged to provide a self centering action during operation to center the seed disk on the disk seat relative to an axis of the drive shaft.

8. The seed metering device according to claim 1, wherein said plurality of lobe sockets on the seed disk comprise at least three lobe sockets, the number of seed pockets on the seed disk is a multiple of the number of lobe sockets on the seed disk, and wherein said seed pockets are arranged at predetermined positions relative to said lobe sockets so that said seed disk can be installed on the disk seat in a plurality of positions without affecting a seed drop timing relative to an adjacent seed metering device in a twin row seeder.

9. A seed metering device for an agricultural seeder, comprising:
a seed disk having a series of seed pockets spaced around an outer circumference;
a center shaft that provides a driving force to rotate the seed disk;
a multi lobe disk seat mounted on the center shaft, said disk seat comprising a substantially flat surface, a raised center protruding axially from the flat surface, and at least three tapered lobes that extend outwardly from the raised center; and said seed disk has a flat face that abuts the flat surface of the disk seat, an open center that receives the raised center of the disk seat, and a plurality of lobe sockets that receive the tapered lobes of said disk seat.

10. The seed metering device according to claim 9, wherein said plurality of tapered lobes comprise four tapered lobes, and said plurality of lobe sockets comprise four lobe sockets.

11. The seed metering device according to claim 9, further comprising a clamp for securing the seed disk onto the disk seat with the flat face of the seed disk abutting the flat surface of the disk seat.

12. The seed metering device according to claim 11, wherein said clamp comprises a spring loaded clamp structure having multiple tapered lobes that extend axially from said disk seat, said clamp structure being rotatable relative to said disk seat between a first position in which the tapered lobes of said clamp structure are generally aligned with the tapered lobes of said disk seat for installing and removing the seed disk from the disk seat, and a second position in which the tapered lobes of said clamp structure are not aligned with the tapered lobes of said disk seat and a surface of the clamp structure is pressed against an outer surface of the seed disk to urge the seed disk against the disk seat.

13. The seed metering device according to claim 9, wherein said lobe sockets are substantially larger than said tapered lobes so that said tapered lobes fit loosely within said lobe sockets with a clearance that allows the seed disk to be easily installed and removed from the disk seat, and wherein said tapered lobes and said lobe sockets are arranged to provide a self centering action during operation to center the seed disk on the disk seat relative to the meter housing.

14. The seed metering device according to claim 9, wherein said plurality of lobe sockets on the seed disk comprise at least three lobe sockets, the number of seed pockets on the seed disk is a multiple of the number of lobe sockets on the seed disk, and wherein said seed pockets are arranged at predetermined positions relative to said lobe sockets so that said seed disk can be installed on the disk seat in a plurality of positions without affecting a seed drop timing relative to an adjacent seed metering device in a twin row seeder.

15. A seed disk for a seed metering device, comprising:
a substantially circular disk having a series of seed pockets spaced around an outer circumference thereof;
said seed disk being adapted to rotate about a center axis to pick up seeds from a seed pool and drop the seeds into a seed tube; and
said pockets of said seed disk each have a leading lip that provides a final surface of the seed disk to contact the seed before the seed is dropped, and said leading lip is parallel to said center axis and perpendicular to a centerline of the seed tube.

16. The seed disk according to claim 15, wherein said pockets each have a width in a direction parallel to said center axis and a height in a radial direction of said disk perpendicular to said width, and wherein said width is greater than said height so that flat seeds oriented face down can be singulated and received in said pockets.

17. A seed disk for a seed metering device, comprising:
a substantially circular disk having a center mounting portion and a series of pockets spaced around an outer circumference of said disk;
said seed disk being adapted to rotate about a center axis to pick up seeds from a seed pool and drop the seeds into a seed tube; and a wiping rib formed on a surface of the seed disk, said wiping rib comprising a raised structure formed on a surface of the seed disk facing the seed pool, said wiping rib extending radially outwardly from a first end located adjacent to said center mounting portion of the seed disk to a second end located adjacent to one of said pockets and being arranged to perform at least one of the functions of agitating seed in the seed pool and wiping and dislodging residue from a brush assembly as the seed disk rotates.

* * * * *